(12) United States Patent  
Knight

(10) Patent No.: US 7,104,507 B1  
(45) Date of Patent: Sep. 12, 2006

(54) VERY SAFE MANNED ROCKET AND METHOD OF ENTERTAINING

(76) Inventor: Andrew F. Knight, 2521 Glengyle Dr., Vienna, VA (US) 22181

( * ) Notice: Subject to any disclaimer, the term of this patent is extended or adjusted under 35 U.S.C. 154(b) by 0 days.

(21) Appl. No.: 10/801,829

(22) Filed: Mar. 17, 2004

Related U.S. Application Data

(63) Continuation-in-part of application No. 10/712,338, filed on Nov. 14, 2003.

(51) Int. Cl.
*B64G 1/40* (2006.01)

(52) U.S. Cl. .............................. 244/171.1; 244/172.2; 60/227

(58) Field of Classification Search ............ 244/171.1, 244/171.3, 171.9, 172.2, 172.3, 169, 62, 244/73 R; 60/246, 227, 224, 263, 203.1, 60/267, 266, 221, 222
See application file for complete search history.

(56) References Cited

U.S. PATENT DOCUMENTS 2,973,436 A * 2/1961 Sims, Jr. .................. 60/39.281
3,293,854 A * 12/1966 Walker ........................ 60/227
6,290,184 B1 * 9/2001 Paterro .................... 244/171.1
6,367,243 B1 * 4/2002 Schmidt .................... 60/203.1

* cited by examiner

*Primary Examiner*—Timothy D. Collins

(57) ABSTRACT

A rocket includes: 1) an air-breathing external combustion rocket engine including: a fuel tank configured to contain a fuel combustible with air; a working medium tank configured to contain a working medium; a combustor connected to the fuel tank and configured to combust the fuel with air to form a hot product gas; a heat exchanger connected to the combustor and configured to heat the working medium with the hot product gas via heat conducting walls of the heat exchanger so as to generate a high-energy working medium having a high pressure; and a nozzle connected to at least one of the working medium tank and the heat exchanger and configured to expand the high-energy working medium so as to generate thrust; and 2) accommodations for a human passenger sufficient to allow the human passenger to fly on the rocket.

20 Claims, 8 Drawing Sheets

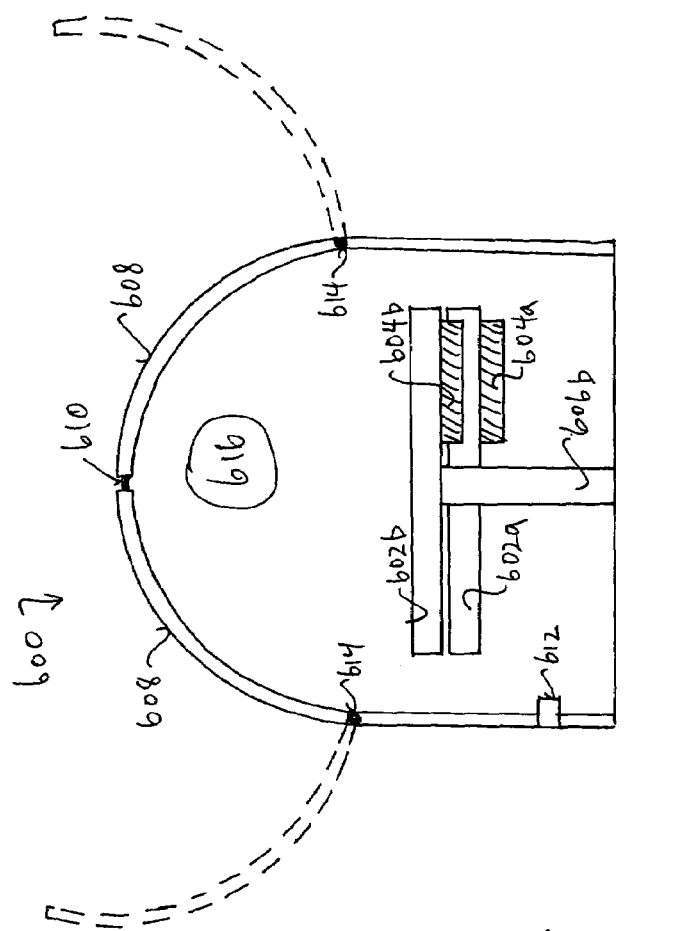
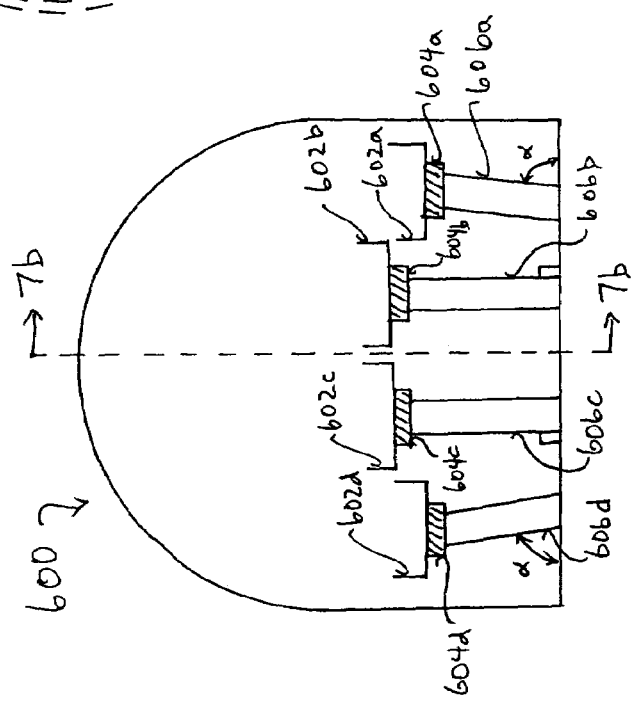
Fig. 7b
Fig. 7a

VERY SAFE MANNED ROCKET AND METHOD OF ENTERTAINING

CROSS REFERENCE TO RELATED APPLICATIONS

The present application is a Continuation-in-Part of U.S. patent application Ser. No. 10/712,338 filed Nov. 14, 2003, the disclosure of which is hereby incorporated by reference.

BACKGROUND

Space tourism is upon us. The next decade will see drastic reductions in cost and improvements in safety in various space-related flights, such as suborbital flights, flights to an orbiting space station or hotel, and flights to the moon and beyond. Private industry and innovation will soon make exotic trips affordable.

SUMMARY OF THE INVENTION

One problem with current endeavors in space tourism is that they "begin" with suborbital flights. Unfortunately, suborbital flights may require at least pressure-fed liquid rocket propulsion. Such systems require a rocket engine that internally combusts (or, in the case of monopropellant systems, catalytically decomposes) in a combustion chamber highly dangerous, reactive chemicals at extremely high temperatures and pressures. Even this extremely simple design (a pressure-fed system) has several disadvantages and complications that reduce reliability and safety and, therefore, increase price: the combustion chamber must be protected from the extremely hot combustion gases (such as by regenerative cooling or use of an ablative material); imperfect ignition timing could cause a disastrous "hard start"; the combustion must be shielded from a variety of instabilities that could cause an explosion (e.g., pogo, screaming); having highly reactive chemicals onboard is dangerous per se, and could cause an enormous, nonsuppressable fire in the event of undesired ignition; the propellants are often cryogenic, hard to store, exotic, toxic, and expensive; etc. In other words, even the safest, simplest, pressure-fed liquid propellant systems (which may be necessary to achieve a suborbital and/or orbital flight) are very expensive to safely design, launch, and fly. As of the present filing, at least one private company has offered to sell tickets for future suborbital (e.g., 60-mile) flights for around $100,000.

Who's got $100,000 lying around? The inventor has discovered that an extremely simple, inexpensive, safe, and highly reliable rocket may be built and utilized for low altitude rocket flights at a small fraction of this cost. The rocket has a very low performance (e.g., as measured by specific impulse), but the simplicity of the design and ready commercial availability of its materials and propellants so outweighs the detriments of its low performance that an actual rocket launch to an altitude of a few miles may be accomplished for well under $5,000.

According to an embodiment of the present invention, a rocket comprises: 1) an air-breathing external combustion rocket engine comprising: a fuel tank configured to contain a fuel combustible with air; a working medium tank configured to contain a working medium; a combustor connected to the fuel tank and configured to combust said fuel with air to form a hot product gas; a heat exchanger connected to the combustor and configured to heat said working medium with said hot product gas via heat conducting walls of the heat exchanger so as to generate a high-energy working medium having a high pressure; and a nozzle connected to at least one of the working medium tank and the heat exchanger and configured to expand said high-energy medium so as to generate thrust; and 2) accommodations for a human passenger sufficient to allow said human passenger to fly on said rocket. The rocket engine may be a pump-fed engine, whereby said rocket engine further comprises a pump connected to the working medium tank and configured to pump said working medium from a low pressure in said working medium tank to at least said high pressure. The rocket engine may be a pressure-fed engine, whereby said working medium tank is configured to contain said working medium at said high pressure. The rocket may comprise a scoop configured to scoop air into the combustor. The rocket may further comprise said fuel and said working medium, wherein said fuel comprises one of a hydrocarbon and an alcohol, and said working medium comprises water.

In one aspect, the rocket further comprises a second stage connected to said accommodations and detachable from a first stage, said first stage comprising said working medium tank, said heat exchanger, and said nozzle, wherein said second stage comprises: said fuel tank; said combustor; a second working medium tank configured to contain a second working medium; a second heat exchanger connected to the combustor and configured to heat said second working medium via heat conducting walls of the second heat exchanger so as to generate a high-energy second working medium having a second high pressure, and a second nozzle configured to expand said high-energy second working medium so as to generate thrust to accelerate said second stage and said accommodations after detachment from said first stage. The heat exchanger may be connected to said combustor via a quick disconnect connector. The heat exchanger may comprise a first portion and a second portion, wherein said high-energy working medium comprises a liquid phase and a gas phase, wherein said first portion is configured to heat said liquid phase so as to generate a saturated gas, and wherein said second portion is configured to heat said gas phase so as to generate a superheated, nonsaturated gas, and wherein said second heat exchanger comprises a third portion and a fourth portion, wherein said high-energy second working medium comprises a second liquid phase and a second gas phase, wherein said third portion is configured to heat said second liquid phase so as to generate a second saturated gas, and wherein said fourth portion is configured to heat said second gas phase so as to generate a second superheated, nonsaturated gas.

In another aspect, the rocket further comprises a second stage connected to said accommodations and detachable from a first stage, said first stage comprising said fuel tank, said working medium tank, said combustor, said heat exchanger, and said nozzle, wherein said second stage comprises: a second working medium tank configured to contain a second working medium; a second heat exchanger configured to heat said second working medium via heat conducting walls of the second heat exchanger so as to generate a high-energy second working medium having a second high pressure; and a second nozzle configured to expand said high-energy second working medium so as to generate thrust to accelerate said second stage and said accommodations after detachment from said first stage. The second heat exchanger may be connected to the combustor via a quick disconnect connector. The second stage may be an emergency eject stage, wherein the second stage comprises an accelerometer and a controller connected to the accelerometer, wherein the controller is configured to detach said second stage from said first stage upon receiving a predetermined signal from the accelerometer.

In another aspect, the rocket further comprises a binary valve configured to start a flow of said high-energy working medium from said nozzle, wherein said binary valve is configured such that: a) while a pressure inside said working medium tank is less than a threshold operating pressure, the valve remains closed; and b) when said pressure rises above the threshold operating pressure, the valve opens approximately fully.

In another aspect, the rocket further comprises a continuous valve configured to be capable of substantially continuously adjusting a flow rate of said high-energy working medium from said nozzle, wherein said continuous valve is configured to adjust said flow rate so that said thrust causes a substantially constant acceleration on said rocket throughout a flight of at least one of said rocket and a stage of said rocket.

In another aspect, said heat exchanger comprises a first portion and a second portion, wherein said high-energy working medium comprises a liquid phase and a gas phase, wherein said first portion is configured to heat said liquid phase so as to generate a saturated gas, and wherein said second portion is configured to heat said gas phase so as to generate a superheated, nonsaturated gas.

In another aspect, the rocket may further comprise a rocket parachute connected to said rocket and a parachute controller connected to said rocket parachute and configured to open said rocket parachute after said rocket reaches a flight apogee, wherein said rocket parachute is configured to land said rocket without causing substantial damage to the rocket. The rocket parachute may comprise a steering mechanism, wherein said rocket further comprises a steering controller connected to said steering mechanism and configured to control said steering mechanism so as to land said rocket at a predetermined landing region. The rocket parachute may comprise a steering mechanism, wherein said rocket further comprises a steering controller connected to said steering mechanism and configured to control said steering mechanism so as to reduce a vertical speed of said rocket when landing. The rocket parachute may be a quick-open parachute that does not require air pressure from a high vertical speed to open the quick-open parachute. The rocket may further comprise: a valve, comprising at least one of a binary valve and a continuous valve, configured to regulate a flow of said high-energy working medium from said nozzle; and a valve controller connected to said valve and configured to open said valve so as to generate a landing thrust after said rocket parachute has been deployed and before said rocket has landed, wherein a landing impact speed of the rocket is reduced by said landing thrust. The rocket may further comprise a deformable material configured and positioned on the rocket so as to absorb an energy of impact due to the landing of the rocket.

In another aspect, the rocket further comprises a shock absorber between said rocket engine and said accommodations and configured to absorb a shock created by an unexpected breach in the working medium tank. A minimum distance between said accommodations and said working medium tank may be at least 10 feet. The working medium tank may be configured to burst in a predictable manner. The working medium tank may comprise walls having a first thickness, wherein said working medium tank is configured to burst in a predictable manner in a burst region, wherein said burst region comprises curves having a wall thickness thinner than said first thickness. The working medium tank may be configured to contain a pressure at least approximately three times greater than said high pressure of said high-energy working medium. The working medium tank may be constructed substantially of at least one of paper and plastic.

In another aspect, said rocket is sized and configured to launch said human passenger to an altitude of at least approximately one mile and at most approximately five miles. The accommodations may be sufficient to allow between two and four passengers to fly on said rocket.

In another aspect, said accommodations may comprise an ejector configured to eject said human passenger approximately when said accommodations have reached an apogee of a flight on said rocket. The accommodations may further comprise: a passenger seat ejectably connected to said ejector; and a passenger parachute connected to said passenger seat. The rocket may further comprise a rocket parachute connected to said rocket and a parachute controller connected to said rocket parachute and configured to open said rocket parachute substantially after said rocket reaches said apogee, wherein said ejector is configured to eject said human passenger with a speed and direction sufficient to ensure a substantial horizontal distance between said accommodations and said human passenger when said parachute controller opens said rocket parachute.

In another embodiment of the present invention, a rocket system comprises: 1) a heat source; 2) a rocket engine comprising: a working medium tank configured to contain a working medium at a pressure substantially greater than atmospheric pressure; a heat exchanger connectable to the heat source and configured to heat said working medium via heat conducting walls of the heat exchanger so as to generate a high-energy working medium having a high pressure; and a nozzle connected to at least one of the working medium tank and the heat exchanger and configured to expand said high-energy working medium so as to generate thrust; and 3) accommodations for a human passenger sufficient to allow said human passenger to fly on said rocket, wherein at least one of the following is true: i) said working medium tank is configured to contain a pressure at least approximately three times greater than said high pressure of said high-energy working medium; ii) said rocket further comprises a shock absorber located between said rocket engine and said accommodations and configured to absorb a shock created by an unexpected breach in the working medium tank; iii) a minimum distance between said accommodations and said working medium tank is at least 10 feet; iv) wherein said working medium tank comprises walls having a first thickness, wherein said working medium tank is configured to burst in a predictable manner in a burst region, wherein said burst region comprises curves having a wall thickness thinner than said first thickness; and v) wherein said working medium tank is constructed substantially of at least one of paper and plastic. At least two or three or four or five of i)–v) may true. Further, i) or ii) or iii) or iv) or v) may be true.

In another embodiment of the present invention, a method of entertaining comprises performing or inciting a person to perform at least one of steps a)–k): a) providing on a launchpad a rocket as described herein, wherein said rocket engine is a pressure-fed engine, whereby said working medium tank is configured to contain said working medium at said high pressure; b) opening a fill valve connected to said working medium tank; c) adding said working medium at a low pressure to said working medium tank via said fill valve; d) closing said fill valve; e) adding said fuel at a low pressure to said fuel tank; f) causing said fuel to flow to said combustor; g) igniting and combusting said fuel with air in said combustor to form said hot product gas; h) while said rocket is on the launchpad, heating said working medium with said hot product gas via said heat conducting walls of said heat exchanger to a vapor pressure substantially greater than atmospheric pressure; i) while said rocket is on the launchpad, replenishing to said fuel tank at least some fuel that has been combusted in said combustor while said rocket has remained on the launchpad; j) launching said rocket by causing said high-energy working medium to flow through and expand from said nozzle; and k) while said rocket is in flight, combusting said fuel with air in said combustor to form said hot product gas and heating said working medium with said hot product gas via said heat conducting walls of said heat exchanger to maintain said vapor pressure substantially greater than atmospheric pressure, wherein steps a)–k) are performed. The fuel may comprise one of a hydrocarbon and an alcohol, and said working medium may comprise water.

In another aspect, the method further comprises inciting said human passenger to fly in said rocket. The method may further comprise inciting a trained professional to fly in said rocket with said human passenger, wherein said trained professional is trained to assist human passengers in safely executing a flight plan.

In another aspect, the method further comprises providing to said human passenger a passenger parachute, which may be a quick-open parachute that does not require air pressure from a high vertical speed to open the quick-open parachute.

In another aspect, the rocket provided in step a) may comprise a second stage connected to said accommodations and detachable from a first stage, said first stage comprising said working medium tank, said heat exchanger, and said nozzle, wherein said second stage comprises: said fuel tank; said combustor; a second working medium tank configured to contain a second working medium; a second heat exchanger connected to the combustor and configured to heat said second working medium via heat conducting walls of the second heat exchanger so as to generate a high-energy second working medium having a second high pressure, and a second nozzle configured to expand said high-energy second working medium so as to generate thrust to accelerate said second stage and said accommodations after detachment from said first stage, wherein said heat exchanger is connected to said combustor via a quick disconnect connector, and wherein the method may further comprise, while said rocket is in flight: detaching said second stage from said first stage; combusting said fuel with air in said combustor to form said hot product gas and heating said second working medium with said hot product gas via heat conducting walls of said second heat exchanger; and causing said high-energy second working medium to flow through and expand from said second nozzle.

In another aspect, the heat exchanger may comprises a first portion and a second portion, wherein said high-energy working medium comprises a liquid phase and a gas phase, wherein said first portion is configured to heat said liquid phase so as to generate a saturated gas, and wherein said second portion is configured to heat said gas phase so as to generate a superheated, nonsaturated gas, and wherein said second heat exchanger comprises a third portion and a fourth portion, wherein said high-energy second working medium comprises a second liquid phase and a second gas phase, wherein said third portion is configured to heat said second liquid phase so as to generate a second saturated gas, and wherein said fourth portion is configured to heat said second gas phase so as to generate a second superheated, nonsaturated gas.

In another aspect, said combustor of said rocket provided in step a) may further comprise a valve configured to selectably direct said hot product gas between at least two of said four portions, and wherein step h) of said method comprises, while said rocket remains on said launchpad: directing said hot product gas to at least one of said first and third portions of a corresponding one of said working medium tank and second working medium tank; after a pressure in said corresponding one of said working medium tank and second working medium tank has reached at least approximately a corresponding one of said high pressure and said second high pressure, activating said vale so as to substantially stop directing said hot product gas to said at least one of said first and third portions; and directing said hot product gas to at least one of said second and fourth portions.

In another aspect, the rocket provided in step a) comprises a second stage connected to said accommodations and detachable from a first stage, said first stage comprising said fuel tank, said working medium tank, said combustor, said heat exchanger, and said nozzle, wherein said second stage comprises: a second working medium tank configured to contain a second working medium; a second heat exchanger configured to heat said second working medium via heat conducting walls of the second heat exchanger so as to generate a high-energy second working medium having a second high pressure; and a second nozzle configured to expand said high-energy second working medium so as to generate thrust to accelerate said second stage and said accommodations after detachment from said first stage, and wherein the method may further comprise, while said rocket is in flight: detaching said second stage from said first stage; and causing said high-energy second working medium to flow through and expand from said second nozzle.

In another aspect, the rocket provided in step a) comprises a second stage connected to said accommodations and detachable from a first stage, said first stage comprising said fuel tank, said working medium tank, said combustor, said heat exchanger, and said nozzle, wherein said second stage comprises: a second working medium tank configured to contain a second working medium; a second heat exchanger configured to heat said second working medium via heat conducting walls of the second heat exchanger so as to generate a high-energy second working medium having a second high pressure; and a second nozzle configured to expand said high-energy second working medium so as to generate thrust to accelerate said second stage and said accommodations after detachment from said first stage, and wherein the method may further comprise, while said rocket remains on the launchpad: identifying an emergency situation; detaching said second stage from said first stage; and causing said high-energy second working medium to flow through and expand from said second nozzle.

In another aspect, said rocket provided in step a) further comprises a binary valve configured to start a flow of said high-energy working medium from said nozzle, wherein said binary valve is configured such that: a) while a pressure inside said working medium tank is less than a threshold operating pressure, the valve remains closed; and b) when said pressure rises above the threshold operating pressure, the valve opens approximately fully.

In another aspect, said rocket provided in step a) further comprises a continuous valve configured to be capable of substantially continuously adjusting a flow rate of said high-energy working medium from said nozzle, wherein said continuous valve is configured to adjust said flow rate so that said thrust causes a substantially constant acceleration on said rocket throughout a flight of at least one of said rocket and a stage of said rocket.

In another aspect, said heat exchanger of said rocket provided in step a) comprises a first portion and a second portion, wherein said high-energy working medium comprises a liquid phase and a gas phase, wherein said method may further comprise: heating said liquid phase with said first portion so as to generate a saturated gas; and heating said gas phase with said second portion so as to generate a superheated, nonsaturated gas.

In another aspect, the rocket provided in step a) further comprises a rocket parachute connected to said rocket and a parachute controller connected to said rocket parachute and configured to open said rocket parachute after said rocket reaches a flight apogee, wherein said rocket parachute is configured to land said rocket without causing substantial damage to the rocket. The rocket parachute may comprise a steering mechanism, wherein said method further comprises controlling said steering mechanism so as to land said rocket at a predetermined landing region. The rocket parachute may comprise a steering mechanism, wherein said method further comprises controlling said steering mechanism so as to reduce a vertical speed of said rocket when landing. The rocket parachute may be a quick-open parachute that does not require air pressure from a high vertical speed to open the quick-open parachute. The rocket provided in step a) may further comprise: a valve, comprising at least one of a binary valve and a continuous valve, configured to regulate a flow of said high-energy working medium from said nozzle; and wherein said method further comprises opening said valve so as to generate a landing thrust after said rocket parachute has been deployed and before said rocket has landed, wherein a landing impact speed of the rocket is reduced by said landing thrust. The rocket provided in step a) may further comprise a deformable material configured and positioned on the rocket so as to absorb an energy of impact due to the landing of the rocket.

In another aspect, said rocket provided in step a) is sized and configured to launch said human passenger to an altitude of at least approximately one mile and at most approximately five miles, and wherein said method further comprises launching said human passenger to said altitude. The accommodations of said rocket provided in step a) may be sufficient to allow between two and four passengers to fly on said rocket, and wherein said method further comprises launching between two and four passengers on a flight on said rocket.

In another aspect, said accommodations of said rocket provided in step a) comprise an ejector configured to eject said human passenger approximately when said accommodations have reached an apogee of a flight on said rocket, and wherein said method comprises ejecting said human passenger approximately when said accommodations have reached said apogee. The accommodations may further comprise: a passenger seat ejectably connected to said ejector; and a passenger parachute connected to said passenger seat. The rocket provided in step a) may further comprise a rocket parachute connected to said rocket, and wherein said method further comprises: opening said rocket parachute substantially after said rocket reaches said apogee; and ejecting said human passenger with a speed and direction sufficient to ensure a substantial horizontal distance between said accommodations and said human passenger when said rocket parachute is opened.

In another aspect, the method may further comprise advertising a flight on said rocket, wherein said advertising comprises performing or inciting a person to perform at least one of steps I)–III): I) indicating an existence of a rocket, at least one of the rocket and a flight on which is commercially available for purchase; II) indicating that said rocket is capable of launching and lifting a human passenger to an altitude, wherein said altitude is at least one of: at least a mile; and an altitude sufficient to allow said human passenger to safely parachute to a landing; III) at least one of: indicating that said rocket generates thrust by expelling steam created by heating liquid water; indicating that said rocket utilizes an external combustion engine; indicating that said rocket does not contain a reactive combination of propellants, wherein steps I)–III) are performed.

According to another embodiment of the present invention, a method of advertising comprises performing or inciting a person to perform at least one of the following steps a)–c): a) indicating an existence of a rocket, at least one of the rocket and a flight on which is commercially available for purchase; b) indicating that said rocket is capable of launching and lifting a human passenger to an altitude, wherein said altitude is at least one of: at least a mile; and an altitude sufficient to allow said human passenger to safely parachute to a landing; c) at least one of: indicating that said rocket generates thrust by expelling steam created by heating liquid water; indicating that said rocket utilizes an external combustion engine; indicating that said rocket does not contain a reactive combination of propellants, wherein steps a)–c) are performed. The altitude may not be greater than five miles.

In another aspect, the method further comprises indicating that after said flight at least one of said rocket and said human passenger lands via parachute. The method may further comprise indicating that said rocket is capable of launching and lifting a number of people simultaneously, wherein said number is not greater than four. The method may further comprise indicating that said flight is commercially available for purchase for a price, wherein said price is not greater than US$5000 indexed to 2004 prices.

The method may further comprise indicating that said rocket is safe because at least one of: the rocket engine is air-breathing; the rocket does not contain a reactive combination of propellants; the rocket utilizes an external combustion engine; the rocket utilizes heated liquid water as a propellant; the rocket is simpler in design than any previous manned rocket.

BRIEF DESCRIPTION OF THE DRAWINGS

FIG. 7a shows passenger accommodations according to a preferred embodiment.

FIG. 7b shows a cross section of the passenger accommodations shown in FIG. 7a along section 7b—7b.

DETAILED DESCRIPTION OF PREFERRED EMBODIMENTS

Figure 1:
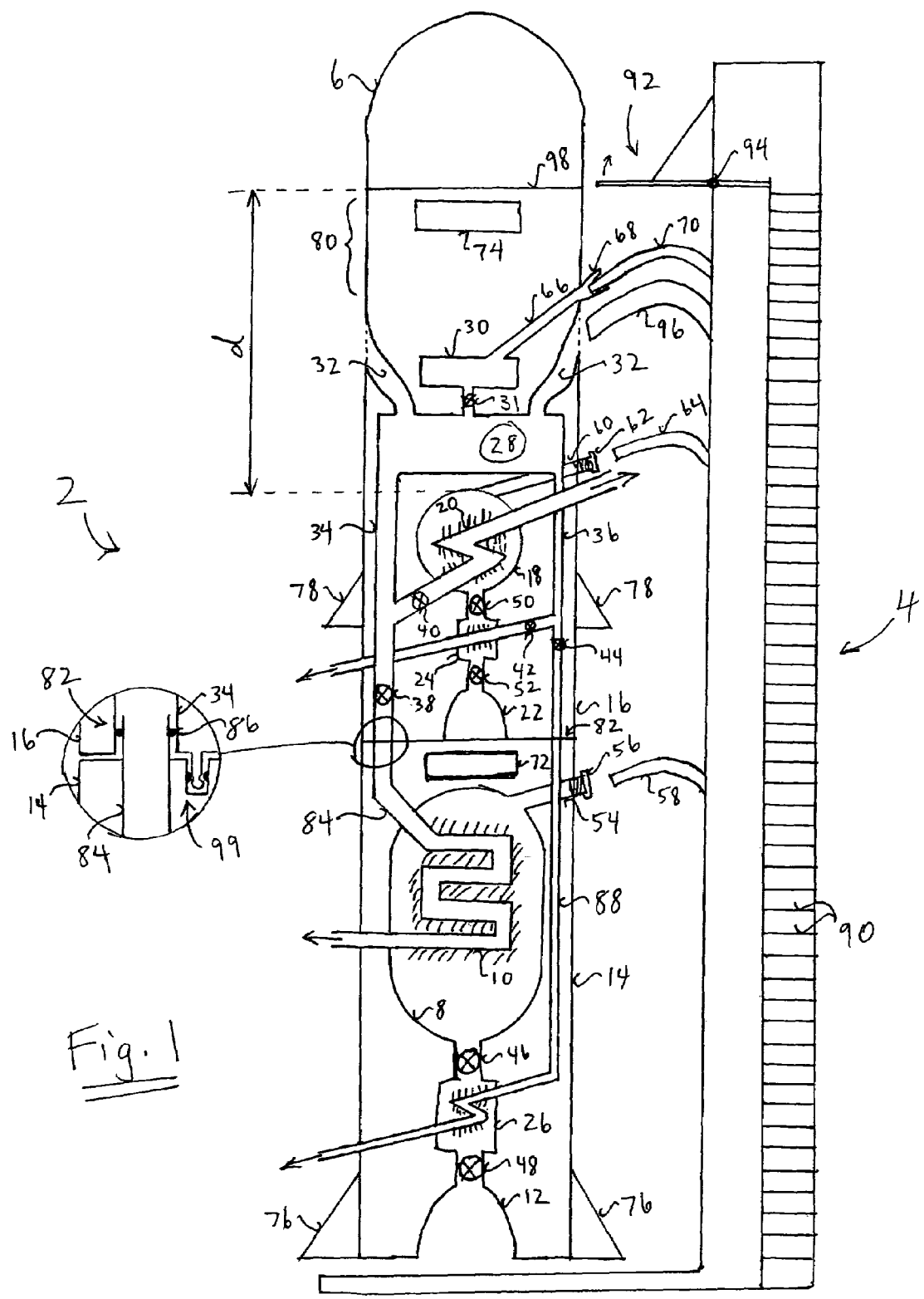
FIG. 1 shows a rocket system according to a preferred embodiment.

Referring now to FIG. 1, a rocket system comprises a rocket 2 provided on a launchpad 4. The rocket 2 comprises human accommodations 6 and two rocket stages: a first stage 14 and a second stage 16 detachably connected to the first stage 14. The first and second stages 14, 16 in the present embodiment are air-breathing external combustion impulse reaction engines. An advantage to the air-breathing feature is that the rocket need not carry its own supply of oxidizer, thus substantially reducing the mass of the system compared to one having its own oxidizer supply. Advantages to the external combustion feature include: a) high-pressure tanks and/or high-pressure pumps are not needed to push reactive propellants into an internal combustion chamber; b) air is readily available as a propellant because high-flow, high-pressure air compressors are not necessary; c) there is little or no threat of ignition "hard starts" or other explosions due to undesirable or unplanned propellant mixtures; and d) the system is simple and safe in design.

The first stage 14 comprises a (first) working medium tank 8 configured to hold a working medium (not shown). The working medium is preferably any inexpensive, non-toxic substance, such as water or liquid carbon dioxide. The working medium is heated by a first portion 10 of a heat exchanger. Heat exchangers are well known in the art. The first portion 10 may comprise, for example, a conduit 84 through which a hot product gas flows, thermally connected to an array of heat conducting fins or plates to increase the total heat transfer surface area. Any heat exchanger known in the art that is capable of conducting heat through its walls from a low pressure, high temperature gas to a high pressure working medium is within the scope of the present invention, and may serve as any of the heat exchangers or "portions" of heat exchangers described herein.

The first portion 10 is preferably located inside the working medium tank 8 so that it is positioned and configured to heat and eventually boil the working medium inside the tank 8 to form a high-pressure saturated vapor of the working medium. At any given time, the working medium has a vapor/gas phase and a liquid phase. As heat is added to the working medium via first portion 10, the vapor pressure of the working medium increases, so that a greater proportion of the working medium exists in the form of gas instead of liquid. In a preferred embodiment, working medium tank 8 is configured—e.g., has walls sufficiently thick—to withstand an extremely high pressure, such as 100 bar (about 100 atm, about 1500 PSI).

The second portion 26 of the heat exchanger is connected to the working medium tank 8 via a valve 46, which is preferably located at a bottom end of the working medium tank 8 so that, upon opening of valve 46, the liquid phase of the working medium in tank 8 flows from tank 8 to the second portion 26. Like the first portion 10, the second portion 26 may comprise a conduit 88 through which hot product gas flows, thermally connected to heat conducting fins or plates to increase the heat conducting surface area. In the embodiment shown, second portion 26 serves both to boil the working medium (or to generate a saturated vapor), as well as to continue to heat the saturated vapor to create a very high-energy, high-temperature, nonsaturated gas. In other words, as the liquid phase starts flowing through the second portion 26, sufficient energy is added to the liquid to boil it to create a saturated gas. The saturated gas continues to flow through and gain additional heat energy in the second portion 26 to create the high-energy, high-temperature, non-saturated gas. The benefit to superheating the saturated gas is well understood in the art: the same mass flow of working medium can produce a higher thrust level.

The valve 46 may be of any type presently known in the art. For example, the valve 46 may be a binary valve configured substantially only for "on" (full flow) and "off" (no flow) configurations. The binary valve may also be pressure-sensitive such that it remains off until a pressure differential across the valve reaches or exceeds a predetermined threshold pressure, in which case it turns on (and allows flow). Such a binary valve may further be configured in one of two ways: a) it may be designed to turn off (stop flow) when the pressure differential drops below the predetermined threshold pressure; or b) it may be designed to remain on even when the pressure differential drops below the predetermined threshold pressure. In case of b), an independent solenoid or other actuator may be connected to the valve to turn the valve off based on an external control (such as a person/pilot pressing a button labeled "off"). Such a solenoid or actuator may also be configured to turn the valve on (when it is off) based on an external control. Further, the binary "valve" may consist essentially of a burst disk or the like, in which case a pressure differential exceeding a predetermined threshold pressure causes a disk of known thickness to irreparably rupture, thus allowing full flow through the valve. Burst disks are very inexpensive, and therefore may be a good option for a binary valve.

Alternatively, the valve 46 may be a continuous valve capable of substantially continuously varying the flow therethrough. Such a continuous valve may adjust the flow based on the pressure differential (e.g., a higher pressure differential causes the valve to open more, allowing a higher flow through the valve), and/or it may adjust the flow due to an independent solenoid or other actuator connected to an external controller (such as a potentiometer adjustable by a human pilot). Any of the valves discussed herein may be of any type currently known in the art.

The second portion 26 is connected to a nozzle 12 via another valve 48. The nozzle 12 has typical convergence (not shown) and divergence sections, defining a throat (not shown) in which the superheated nonsaturated working medium is accelerated to the speed of sound. The diverging region (the parabolically enlarging region) expands the working medium and thus continues to accelerate it supersonically. The supersonically ejected working medium provides an upward thrust to the rocket due to an impulse reaction.

The working medium tank 8 includes a filling conduit 54 having a pressure-sealing cap or fill valve 56. The valve 56 is configured to contain a very high pressure, particularly the vapor pressure of the heated working medium within the tank 8. The first stage 14 further includes: fins 76 for guidance and stability of the rocket during launch and flight; and a rocket parachute and controller 72 (discussed in more detail later).

The second stage 16 comprises similar subsystems, such as a second working medium tank 18 containing a third portion 20 of a second heat exchanger. The second working medium tank 18 is connected to a fourth portion 24 of the second heat exchanger via a valve 50, and the fourth portion 24 is connected to a nozzle 22 via a valve 52. The second working medium tank 18 includes a filling conduit 60 having a pressure-sealing cap or fill valve 62, configured to contain a very high pressure.

The second stage 16, in the embodiment shown in FIG. 1, also includes a combustor 28 connected to first, second, third, and fourth portions 10, 26, 20, 24, respectively, of the first and second heat exchangers via conduits 84, 88, 34, and 36, respectively. The combustor 28 is configured to burn an air-combustible fuel to generate hot product gases that are selectively directed to any or all of the first, second, third, and fourth portions 10, 26, 20, 24 via respective valves 38, 44, 40, and 42. Combustors are well known in the art, particularly combustors that burn typical fuels (such as hydrocarbons, coals, and alcohols) in air, and further detail will be omitted.

Combustor 28 burns fuel provided by fuel tank 30 via valve 31 with air provided by air scoops or funnels 32. Fuel tank 30 includes a filling conduit 66 having a preferably self-closing filling valve 68. Filling valve 68 may be spring-loaded closed, similar to those typically used for automobile gas tanks, so that a filling hose 70 may be removed and the rocket 2 launched without a further need to manually close the valve 68. Scoops/intakes 32 are shaped and configured to direct air into the combustor 28 as the rocket gains speed.

The second stage 16 further includes: fins 78 for guidance and stability of the second stage 16 during flight and after separation/detachment from the first stage 14; and a rocket parachute and controller 74 (discussed in more detail later). The second stage 16 also preferably includes a shock absorber 80 located between the fuel tank 30 and the human accommodations 6. Shock absorbers are well known in the art, and shock absorber may include any currently known in the art. For example, shock absorber 80 may comprise a compressible and/or deformable structure configured to compress and/or deform when an acceleration or shock due to unplanned or undesirable event below the shock absorber 80 exceeds a predetermined amount. For example, if the (first) working medium tank 8 should accidentally explode, a high force may be exerted on the rocket structure about the working medium tank 8, causing a high shock and/or acceleration that causes the shock absorber to compress, deform, or buckle, thus preventing a dangerous or fatal shock or acceleration on the human accommodations 6.

Also, in a preferred embodiment, for added safety, the human accommodations 6 are located a distance d from the second working medium tank 18, so that the force of high-pressure gas/steam emitted due to an explosion or breach of the second working medium tank 18 has sufficient distance to attenuate, thus preventing a dangerous or fatal shock or acceleration on the human accommodations 6. The distance d is preferably at least 5 feet, more preferably at least 8, more preferably at least 10, more preferably at least 15, and more preferably at least 20 feet. In addition or alternatively, an impact deflection plate 98 may be located between the second working medium tank 18 and the human accommodations, to help deflect any high-pressure gas/steam and/or shrapnel created by an explosion or breach of the second working medium tank 18. The impact deflection plate 98 could comprise a simple metal, plastic, wood, etc., plate that is designed to decelerate and/or deflect dangerous gas and/or shrapnel. (Such safety devices/features could, of course, be incorporated into rocket designs having only a single stage, thus helping to protect the human accommodations from a breach in the working medium tank.)

The first stage 14 is connected to the second stage 16 via connectors 99. Connectors are well known in the art, and any such connectors could serve as the connectors 99. In the embodiment shown, a connector 99 comprises a male pin portion and a female receiving portion. The male pin portion includes recesses or notches, and the female receiving portion includes protrusions configured to fit into the recesses/notches to thereby lock the male pin portion to the female receiving portion. The protrusions may comprise an elastically deformable material, so that the male pin portion is removable from the female receiving portion with a sufficient pulling force. Alternatively or in addition, the protrusions may be connected to an actuator configured to retract the protrusions at a specified time, at which time the male pin portion may be freely removed from the female receiving portion. In any event, the prior art contains lots of possible connectors to serve as connectors 99. Preferably, the connectors 99 should be sufficiently strong and secure such that the second stage 16 does not detach from the first stage 14 until required (such as during stage separation during the rocket flight, or during an emergency ejection ignition of the second stage 16 on the launchpad 4), or at least that the second stage 16 does not easily detach from the first stage 14.

Of course, the first and second stages 14, 16 will have many common connections, such as electrical connections. For example, an accelerometer (not shown in FIG. 1) located on the second stage 16 may provide a signal also to a controller on the first stage 14. Easily or readily disconnect-able electrical connectors are well known in the art, and will not be discussed further here. However, in addition to electrical connections, the embodiment shown in FIG. 1 uses a single combustor to commonly provide hot product gas to both heat exchangers (i.e., to the third and fourth portions 20, 24, as well as the first and second portions 10, 26). Therefore, during stage separation, the connection between conduits 34 and 84, as well as the connection between conduits 36 and 88, must be quickly disconnectable. Therefore, these connections are quick disconnect connectors 82 as shown. In the shown quick disconnect connector 82, the conduit 84 slightly extends beyond the first stage 14 as a male portion and the conduit 34 as a female portion receives the conduit 84. Preferable, the connection point is sealed with a gasket or o-ring 86 to prevent or mitigate the passing of hot product gases beyond the conduits 34, 84. Of course, a wide variety of possible "quick-disconnect" connectors are known in the art, and may be used herein as being within the scope of the present invention. Variations on the shown quick disconnect connector 82 are also within the scope of the present invention.

The launchpad 4 includes a ladder 90 allowing a human passenger to climb to the top, where he can board the accommodations 6 of the rocket 2. The launchpad also includes a boarding platform 92, which can be moved upward and out of the way of rocket 2 by rotating on hinge 94, to allow the human passenger to board the accommodations 6. The launchpad 4 also includes several fill hoses: a fuel fill hose 70 configured to be received in the fuel filling valve 68 and to fill the fuel tank 30 with fuel; an air blower hose 96 configured to blow air with relatively high velocity and/or pressure into air scoops/intakes 32; a second working medium fill hose 64 configured to be received in the second working medium tank filling conduit 60 and to fill the second working medium tank 18 with the second working medium; and a first working medium fill hose 58 configured to be received in the first working medium tank filling conduit 54 and to fill the first working medium tank 8 with the first working medium. Of course, other ends of the hoses 70, 96, 64, 58 are connected to appropriate sources (not shown) of fuel, working medium, etc., as well as pumps where appropriate. Further, hoses 70, 96, 64, 58 are preferably rigid and mechanically powered so that they may be extended and retracted upon a controller command.

Operation of the present rocket 2 during launch will now be described. The following steps may be performed in the order presented, or in a different order. Assuming the rocket 2 has already launched and landed, the first step would be to recover the first and second stages 14, 16. Presumably, the stages 14, 16 could be erect or on their sides. First, their parachutes should be re-packed into their respective containers, and any explosive or high-pressure gas (such as in the case of a "quick-open" parachute, described later) should be recharged. A vehicle should be designed that first drives to and backs up to the second stage 16 and then hooks and lifts the second stage 16 onto a movable platform. The vehicle would then drive to and back up to the first stage 14, and then hook and lift the first stage 14 onto the movable platform. The two stages are then brought together, and connected by connectors 99. Next, the assembled rocket 2 may be taken by the vehicle to the launchpad 4, where the rocket 2 is erected and properly placed.

Next, all valves are placed in their proper configurations. First engine valves 46, 48, second engine valves 50, 52, fuel tank valve 31, and second and fourth portion valves 44, 42 are closed, and first and third portion valves 38, 40 are opened.

Next, a safety test is performed on the tanks 8, 18 by filling each tank with a preferably safe and/or inert gas (such as air or nitrogen) to a pressure of approximately double (or more) of the maximum expected operating pressure (MEOP). For example, if the first portion 10 of the first heat exchanger is expected to heat the water in tank 8 to a maximum vapor pressure of 100 bar before launching the rocket 2, then the tank 8 should be tested to a pressure of approximately 200 bar. Of course, a pressure check anywhere from 1.1 to 3.0 or more of MEOP may be appropriate, such as approximately 1.5 MEOP or approximately 2.5 MEOP. Such a test may be performed, while the filling valve/cap 56 is closed and pressure-tight, by inserting the inert gas through a check valve (not shown), which may be similar in design to the filling/check valve on a bicycle or automobile tire. Of course, the filling conduit 54 and filling valve 56 may be used to insert the inert gas by using appropriate pressure-tight connectors and/or adapters, as would be understood by one of ordinary skill in the art. Once the working medium tank 8 has been successfully pressure tested, the pressure is released, e.g., by opening a release valve (not shown). The second working medium tank 18 is then pressure tested in a preferably similar manner. Of course, if either tank 8, 18 explodes during the test, chances are good that it failed the test.

Next, the working medium tank filling valve/cap 56 is opened and the first filling hose 58 inserted into the filling conduit 54. The hose 58 then fills the (first) working medium tank 8 with the working medium, which is preferably water. After the tank 8 is filled, the hose 58 is withdrawn and the filling valve/cap 56 is closed. The second filling hose 64 preferably fills the second working medium tank 18 with the second working medium (also preferably water) in a similar manner.

Next, the human passenger(s) climb ladder 90 of launchpad 4 and cross the boarding platform 92 into the accommodations 6. They strap/belt themselves in to their respective chairs (discussed in more detail later), turn on their radio headsets, and start quivering in anticipation.

Next, fuel filling hose 70 is inserted into the self-closing fuel filling valve 68. The hose 70 then fills the fuel tank 30 with fuel. The hose 70 is not yet retracted. Next, and approximately timed with opening of fuel tank valve 31 and the ignition of the fuel with air, the air hose 96 is inserted into the air scoop(s)/intake(s) and starts blowing air at a relatively high velocity and/or pressure into the combustor 28. An igniter is not shown, but igniters are well known in the art. It may comprise an electric spark (created, e.g., by a piezoelectric element), an electric resistance element (e.g., a "glow plug"), a pyrotechnic element, etc.

After ignition, because of the valve configuration already set, hot product gas flows through first portion 10 of the first heat exchanger via valve 38 and the conduits 34, 84 and through third portion 20 of the second heat exchanger via the valve 40 and conduit 34. The hot product gas is cooled as it heats the working medium (water) in each of the first and second working medium tanks 8, 18, and is ejected via the exhausts indicated by the appropriate arrows. The combustion in combustor 28 continues until the vapor pressures in each of the first and second working medium tanks 8, 18 reaches the desired pressure (as indicated by a pressure gauge, such as a pressure transducer, not shown). In a preferred embodiment, the desired pressure is substantially greater than atmospheric pressure, such as greater than 10 bar, preferably greater than 20 bar, preferably greater than 50 bar, and more preferably greater than 100 bar. Of course, the vapor pressures in each of the tanks 8, 18 may increase at different rates, so one of the valves 38, 40 may need to be turned off prior to the other of the valves 38, 40 to ensure that both tanks 8, 18 reach their desired pressures. Further, the desired vapor pressure in each tank 8, 18 may be different, depending on the design.

Further, each tank 8, 18 may be heated consecutively instead of simultaneously. For example, in a preferred embodiment, because it will take less time for the water in the second working medium tank 18 to heat to the desired vapor pressure than the first working medium tank 8 (which is larger than the second working medium tank 18), the water in the first working medium tank 8 is first heated via first portion 10 by closing valve 40 and keeping valve 38 open. Once the first tank 8 has reached the desired vapor pressure, the valve 40 is opened and the valve 38 is closed, thus directing the flow of the hot product gases through the third portion 20, until the water in the second working medium tank 18 has achieved the desired vapor pressure.

During at least some of the time that the above events occur, fuel fill valve 70 replenishes the fuel consumed during the on-launchpad combustion in combustor 28 by continuing to fill the fuel tank 30 with fuel.

The next few events are all directly precedent to launch, and should probably be performed within short time periods of each other, such as within 10 seconds, preferably within 5 seconds, preferably within two seconds, and preferably within one second. The fuel fill hose 70 is withdrawn from the valve 68, causing the self-closing valve 68 to close. The air hose 96 is also withdrawn. The second portion valve 44 is opened and the first and third portion valves 38, 40 (if open) are closed, thereby directing the hot product gases from the combustor 28 through second portions 26 of the first heat exchangers via conduits 36, 88. The first engine valves 46, 48 are then opened.

High-pressure water then flows through second portion 26 and finally through the nozzle 12, where it expands, accelerates, and generates thrust. The rocket 2 launches from the launchpad 4. Depending on the timing of opening valves 44, 46, and 48, second portion 26 may or may not have had sufficient time to heat up due to flow of hot product gases therethrough. If the second portion 26 has not been given sufficient time to heat up, the expanding high-pressure water may boil in the nozzle, thus reducing the temperature of the resulting gas, thus reducing the available thrust. If the second portion 26 has been given sufficient time to heat up, such a problem is overcome because the high-pressure water will boil to a saturated gas, and the saturated gas will be heated to a superheated, nonsaturated gas. However, in this case, the initial flow (upon launch) could cause a "burping" effect that should be designed around.

Further, each heat exchanger and/or portion should be designed so that the direction of flow of the hot product gas is opposite the flow of the working medium to be heated, so that the temperature of the working medium may be increased to the highest possible level.

Figure 8:
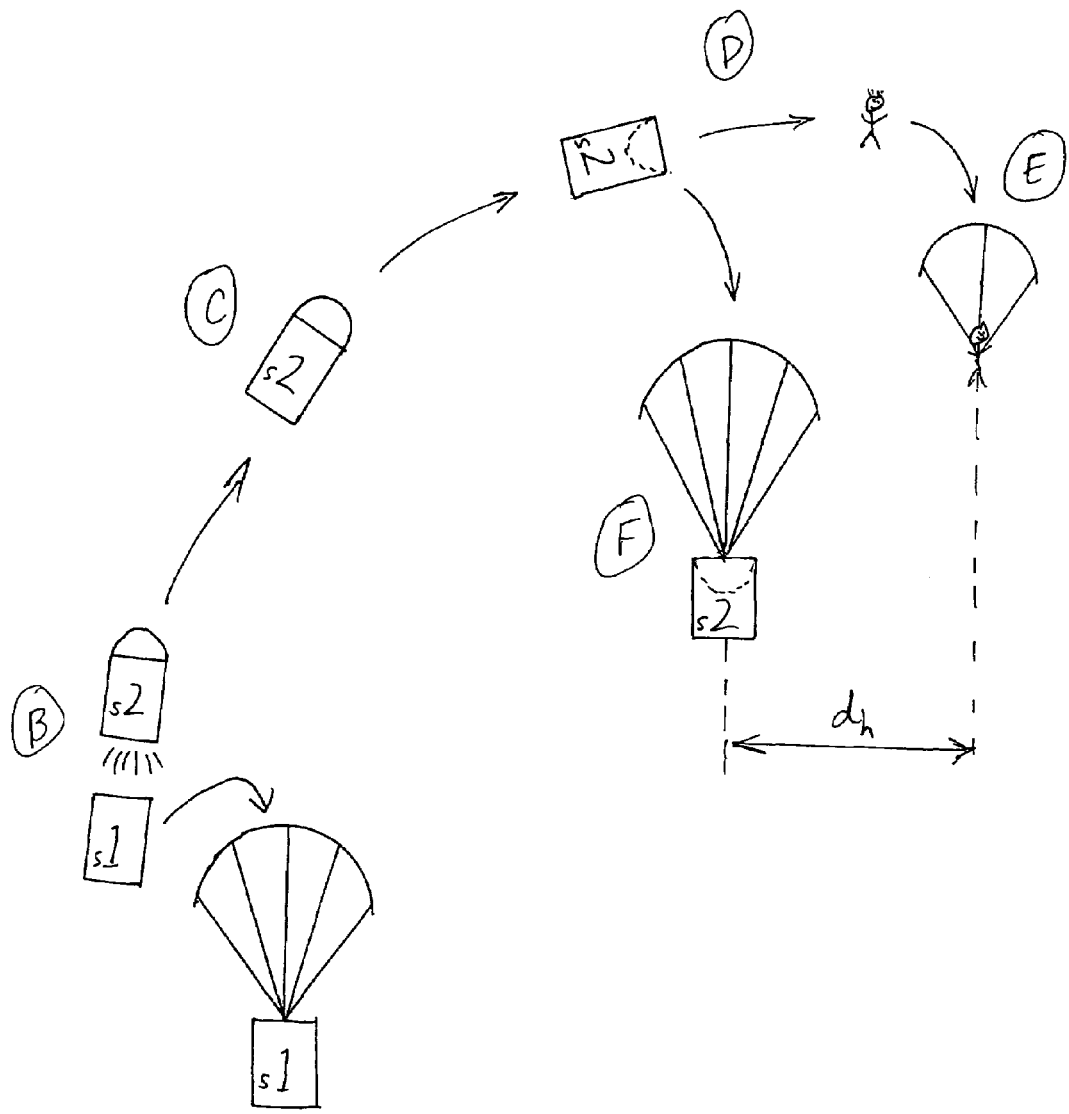
FIG. 8 shows a flight plan of the rocket according to a preferred embodiment.
Figure 8:
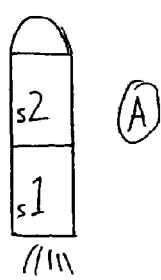

Referring now to FIG. 8 in conjunction with FIG. 1, the launch is designated by "A." Next, at "B," the first stage 14 ("s1") has exhausted (or almost exhausted) all of the water or working medium in the working medium tank 8. Then, the second stage 16 detaches from the first stage 14 by disconnecting connectors 99. Fourth portion valve 42 is opened and second portion valve 44 is closed, causing hot product gas to flow through the fourth portion 24 via conduit 36. At approximately the same time or a short time afterward (again, preferably within a second or two), second engine valves 50, 52 are opened, allowing liquid water to flow through fourth portion 24 of the second heat exchanger to boil the water and superheat the steam to a superheated, nonsaturated gas that is subsequently expanded and accelerated through nozzle 22 to generate thrust. Thus, at "B," the second stage 16 ("s2") "ignites" and continues accelerating the attached passenger accommodations. The second stage 16 continues providing thrust until it has exhausted (or almost exhausted) all of the water or second working medium in the second working medium tank 18.

Because of the likely short flights or "burn times" of each of the stages 14, 16, chances are good that the vapor pressure in the second working medium tank 18 has not substantially dropped. However, if there is such concern, the third portion valve 40 could, of course, be opened concurrent with or just prior to "ignition" of the second stage 16 to further heat the water or second working medium in tank 18.

Because air scoops/intake 32 presumably only take in air when the rocket is moving, and the quantity of air taken in depends on the speed of the rocket relative to the air, the embodiment shown in FIG. 1 (which has no air pumps or fans in the intakes 32) may have very little combustion within the first second or two after launch (when the rocket is still moving slowly). However, the scoops/intakes should be shaped and sized such that the air flow and/or pressure is sufficient within a second or two after launch to fully sustain the required combustion rate in combustor 28. In other words, because the rocket 2 may gain speed relatively quickly, the combustor 28 may be starved of air for only a short time. If this becomes a significant problem during design, at least one of two or more solutions may be implemented: a) a fan or air pump may be added (such as pump 150 shown in FIG. 2); b) the first stage 14 may be powered without any in-flight external combustion, and only the second stage 16 may be powered by in-flight external combustion. In other words, in option b), the first stage 14 may look somewhat like the design shown in FIG. 5, in which all heating and combustion occurs on the launchpad by a heat source external to the rocket. The advantage to option b) is that it eliminates the complexities of heating two heat exchangers of detachable stages with a common combustor. It is believed that the drop in performance due to option b) is probably not worth the savings in complexity.

In the embodiment of FIG. 1, the combustor 28 is part of the second stage 16, so that the rocket 2 may gain the advantages of superheated gas/steam even during the second stage 16 of the flight.

Figure 2:
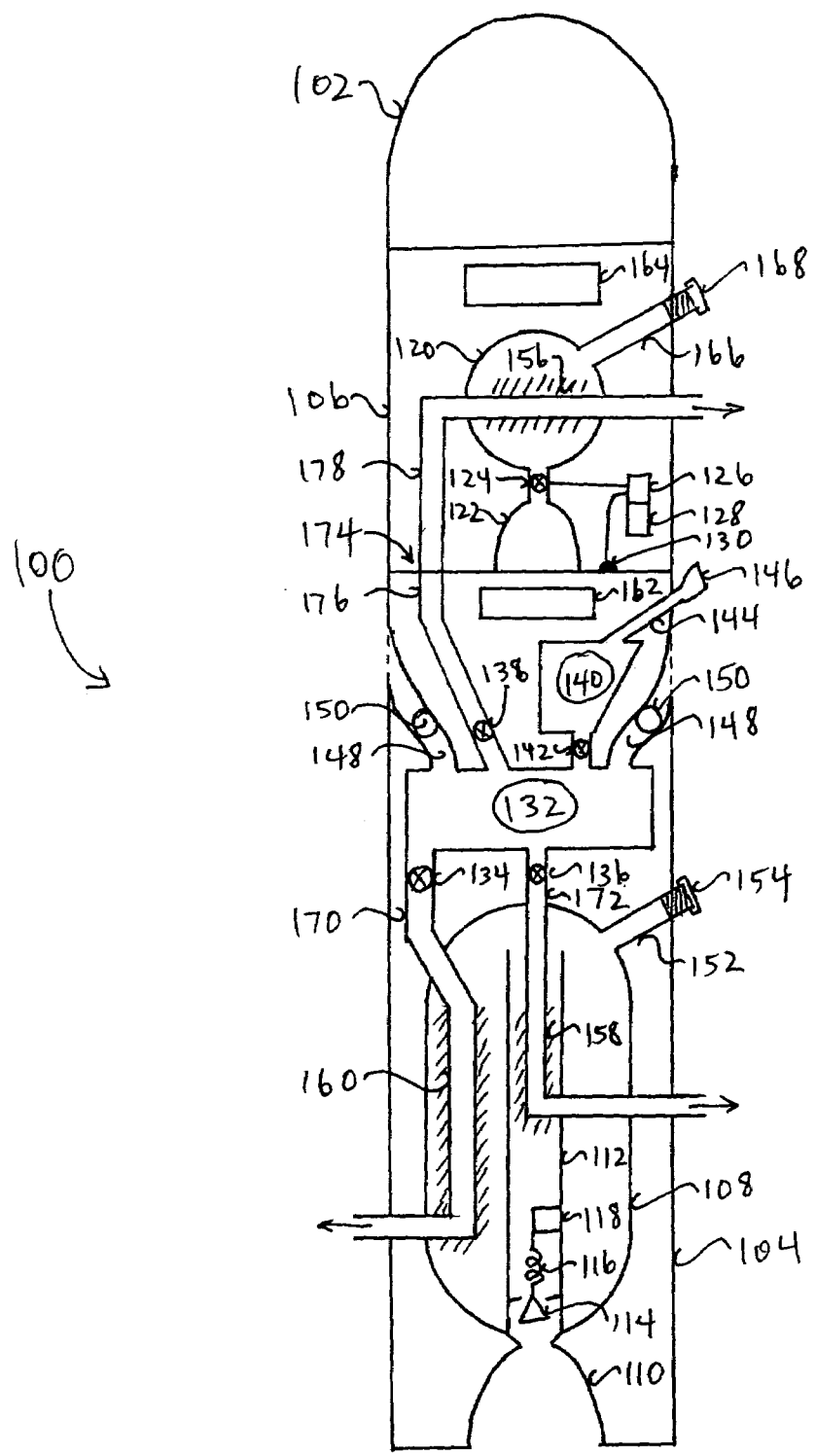
FIG. 2 shows a rocket according to another preferred embodiment.

Referring now to FIG. 2, another embodiment in shown in which the combustor 132 is part of the first stage 104, and the second working medium is not heated during the second stage of the rocket flight. Specifically, in FIG. 2, a rocket 100 comprises passenger accommodations 102, a first stage 104, and a second stage 106. The first stage 104 comprises a first working medium tank 108 configured to contain a first working medium (preferably water) at a very high pressure, such as those mentioned previously for the working medium tanks 8, 18 in FIG. 1. The first stage 104 further comprises a nozzle 110 connected to the working medium tank 108 and a variable and/or continuous valve having a valving member 114 connected to an actuator 118 via a spring member 116. The spring member 116 may include any object or device that is compressible or stretchable, preferably elastically, such that the degree of movement of the valving member 114 (thus determining the available flow area through the valve and, thus, the flow rate of the working medium through the valve) depends on the stretching or compression of the spring member 116. For example, the spring member 116 and valving member 114 may be configured such that as the pressure differential across the valve increases, the valving member 114 opens more, thus allowing a greater flow, and decreasing the pressure differential. Thus, they may be configured to provide a negative feedback loop system that substantially maintains a constant pressure inside working medium tank 108.

Alternatively or in addition, the spring member 116 is connected to an actuator 118 that may move, stretch, and/or compress the spring member 116 and/or valving portion 114 so that the flow rate of working medium through the valve may be adjusted at least in part by the actuator 118. The actuator 118 may be a device that mechanically moves the spring member 116 and/or valving member 114 by discrete or continuous amounts, and may be of any such device presently known in the art, including but not limited to an electromagnetic device, a pneumatic device, a hydraulic device, etc. The actuator 118 may also include a controller and/or a sensor (such as an accelerometer) that is configured to adjust the displacement of the spring member 116 and/or valving member 114 in response to a particular sensed value. As an example but not a limitation, the actuator 118 may include an accelerometer that determines an acceleration of the rocket 2. The actuator 118 may also include a controller programmed to adjust the spring member 116 and/or valving member 114 based on the signal from the accelerometer. For example, the actuator 118 may be configured to adjust the spring member 116 and/or valving member 114 so at to effect a substantially constant acceleration, or any other desired pre-programmed flight acceleration plan. Such controllers, sensors, and programs are well known in the art, and are not limited to the examples given.

The first working medium tank 108 includes a wall 112 (which could be in the shape of a cylindrical tube) configured to separate the liquid phase of the working medium from the superheated gas phase. The first working medium tank 108 includes a heat exchanger having a first portion 160 located outside of the wall 112 and located to heat and boil the liquid phase of the working medium so as to create a saturated vapor. The heat exchanger of the working medium tank 108 also includes a second portion 158 located substantially inside the wall 112 which is configured and located to superheat the saturated vapor to a superheated, nonsaturated gas which subsequently flows past the valving member 114 and expands in the nozzle 110 to generate thrust. The first working medium tank 108 also includes a first filling conduit 152 and a first filling valve/cap 154 connected thereto and configured to seal the first working medium tank 108 against very high pressures.

The first stage 104 includes a combustor 132 connected to first and second portions 160, 158 via conduits 170, 172, respectively. A first portion valve 134 is located between combustor 132 and first portion 160 to adjust a flow rate of hot product gases to and through first portion 160, and a second portion valve 136 is located between combustor 132 and second portion 158 to adjust a flow rate of hot product gases to and through second portion 158.

The combustor 132 is connected to a fuel tank 140 configured to contain a fuel, via a fuel valve 142. Fuel tank 140 is configured to be filled via a fuel filling conduit 144 connected to a self-closing valve 146. The combustor 132 is also connected to air scoops/intakes 148. At last one of the scoops/intakes 148 includes an air fan and/or pump 150 configured to blow air into the combustor. The fan(s)/pump(s) 150 may include any motor known in the art, including but not limited to: electric, internal combustion, external combustion, reciprocating, rotating, piston-type, turbine-type, etc. The power source for the fan(s)/pump(s) may be the fuel in the fuel tank 140, onboard electric or battery power, or any other power source known in the art. The first stage also includes a first rocket parachute 162.

The first stage 104 is connected to the second stage 106, such as with detachable connectors discussed with reference to FIG. 1. The second stage 106 includes a second working medium tank 120 configured to contain a second working medium (again, preferably water) at very high pressure and connected to a second nozzle 122 via a second engine valve 124. The second working medium tank 120 may be filled via a second filling conduit 166 which may be closed and pressure sealed by second filling valve/cap 168. The second working medium tank 120 also includes a third portion 156 of a second heat exchanger. The combustor 132 located in the first stage 104 is also connected to the third portion 156 via conduits 176 (in the first stage 104) and 178 (in the second stage 106) which are connected by a quick disconnect connector 174. A third portion valve 138 is located between the combustor 132 and the third portion 156 to adjust a flow rate of hot product gases to and through third portion 156.

The second stage 106 also includes an accelerometer or other sensor 128 connected to a controller 126. The controller 126 is configured to detect an emergency situation, such as a situation in which an explosion or breach of the first working medium tank 108 causes a high acceleration and/or shock on the second stage 106 (and connected accommodations 102). If and when the controller 126 detects an emergency situation, it is configured to effect detaching device 130. Detaching device 130 could be a pyrotechnic configured to quickly and effectively detach the second stage 106 from the first stage 104 by causing a small explosion and/or breaking a connection between the two stages 104, 106. Detaching device 130 could also be just the "regular" releasing device for detaching the second stage 106 from the first stage 104 even during a non-emergency situation. Therefore, when the controller 126 receives the required signal from the sensor/accelerometer 128, a signal is sent to the detaching device 130 to detach the second stage 106 from the first stage 104. At approximately the same time, the controller 126 also opens second engine valve 124 to allow high-pressure second working medium in the second working medium tank 120 to expand through the second nozzle 122, thus creating thrust and allowing the second stage 106 to launch away from the first stage 104.

The second stage 106 may also include a second rocket parachute 164. Therefore, the rocket 100 shown in FIG. 2 has a second stage 106 which may be used for at least one or both of these purposes: a) an emergency ejection stage in case an emergency arises while the rocket 100 remains on the launchpad; and/or b) a regular second stage usable in flight after detaching from the first stage 104 after the first stage 104 has exhausted all or almost all of its working medium. Of course, both of these purposes/features are also available to the rocket 2 shown in FIG. 1. However, the safety "ejection" stage (second stage 106) in FIG. 2 has the added safety advantage of being simpler in design, because it does not have a fourth portion of the second heat exchanger.

In operating the rocket 100 in FIG. 2, prior to launch, the vapor pressures in the first and second working medium tanks 108, 120 should be adjusted to their desired values by adjusting their respective first and third portion valves 134, 138 to adjust the respective flow rates of hot product gases through first and third portions 160, 156 from combustor 132. Prior to or concurrent with launch, second portion valve 136 should be opened to allow hot product gas to flow to and through second portion 158. Launch may be initiated by the automatic opening of valving member 114 when the pressure inside tank 108 reaches or exceeds a predetermined value, or launch may be externally caused by causing actuator 118 to open valving member 114 to allow a flow of working medium to and through nozzle 110, where it expands and creates thrust. Unlike third portion valve 138, which should be closed immediately after the vapor pressure inside second working medium tank 120 reaches the desired pressure, first portion valve 134 may remain open (albeit at a different flow rate level, if it is a continuous or non-binary valve) during and after launch to replace the heat lost by the working medium as it boils away during the rocket's flight.

When the first stage 104 has exhausted all or almost all of its working medium, the second stage 106 detaches from the first stage 104 (such as by effecting detacher 130) and accelerates away from the first stage 104 after second engine valve 124 is opened and high-pressure second working medium flows and expands through second nozzle 122.

Figure 3C:
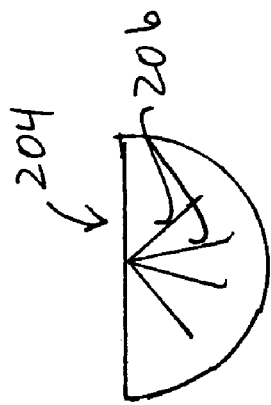
FIG. 3c shows a bottom view of the cross section shown in FIG. 3b.
Figure 3B:
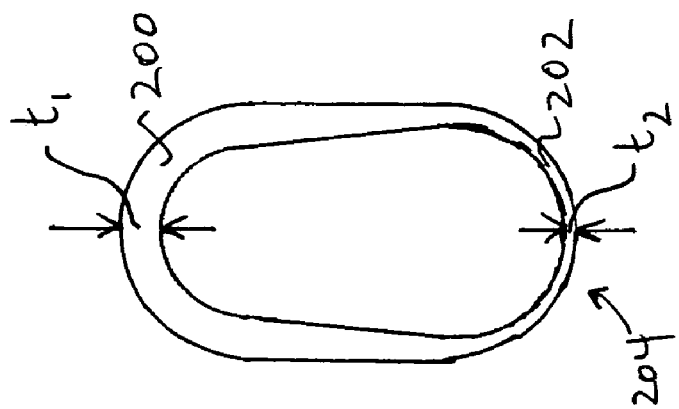
FIG. 3b shows a cross section of the working medium tank shown in FIG. 3a along section 3b—3b.
Figure 3A:
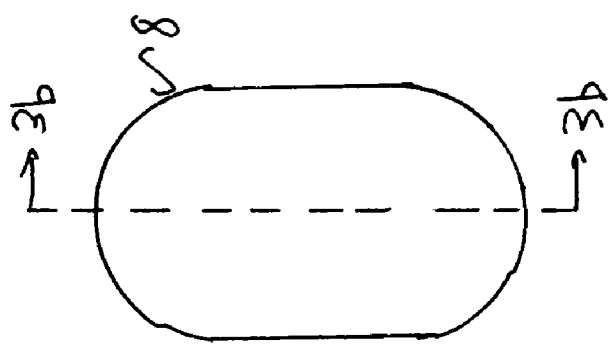
FIG. 3a shows a working medium tank according to a preferred embodiment.

Referring now to FIGS. 3a–3c, a working medium tank 8 (such as that shown in FIG. 1) has varying wall thickness that changes from a first thickness $t_1$ in a first region 200 to a second thickness $t_2$ in a second region 202. Because the second thickness $t_2$ in the second region 202 is thinner than the first thickness $t_1$ in the first region 200, the second region 202 defines a burst region 204 such that, in the case of tank overpressurization, tank breach, or tank malfunction, the tank 8 preferentially bursts in the burst region 204, which may be located on the bottom of the tank 8 (and thus away from the passenger accommodations 6 in rocket 2 in FIG. 1). FIG. 3c shows a bottom of the cross section shown in FIG. 3b, and shows that the burst region 204 may additionally comprise lines or curves 206 of reduced wall thickness (reduced compared to $t_1$ or preferably $t_2$). The curves 206 may have any shape, and may be shaped to allow the tank 8 to burst in a predetermined, known manner, as would be understood by one of ordinary skill in the art.

Figure 4:
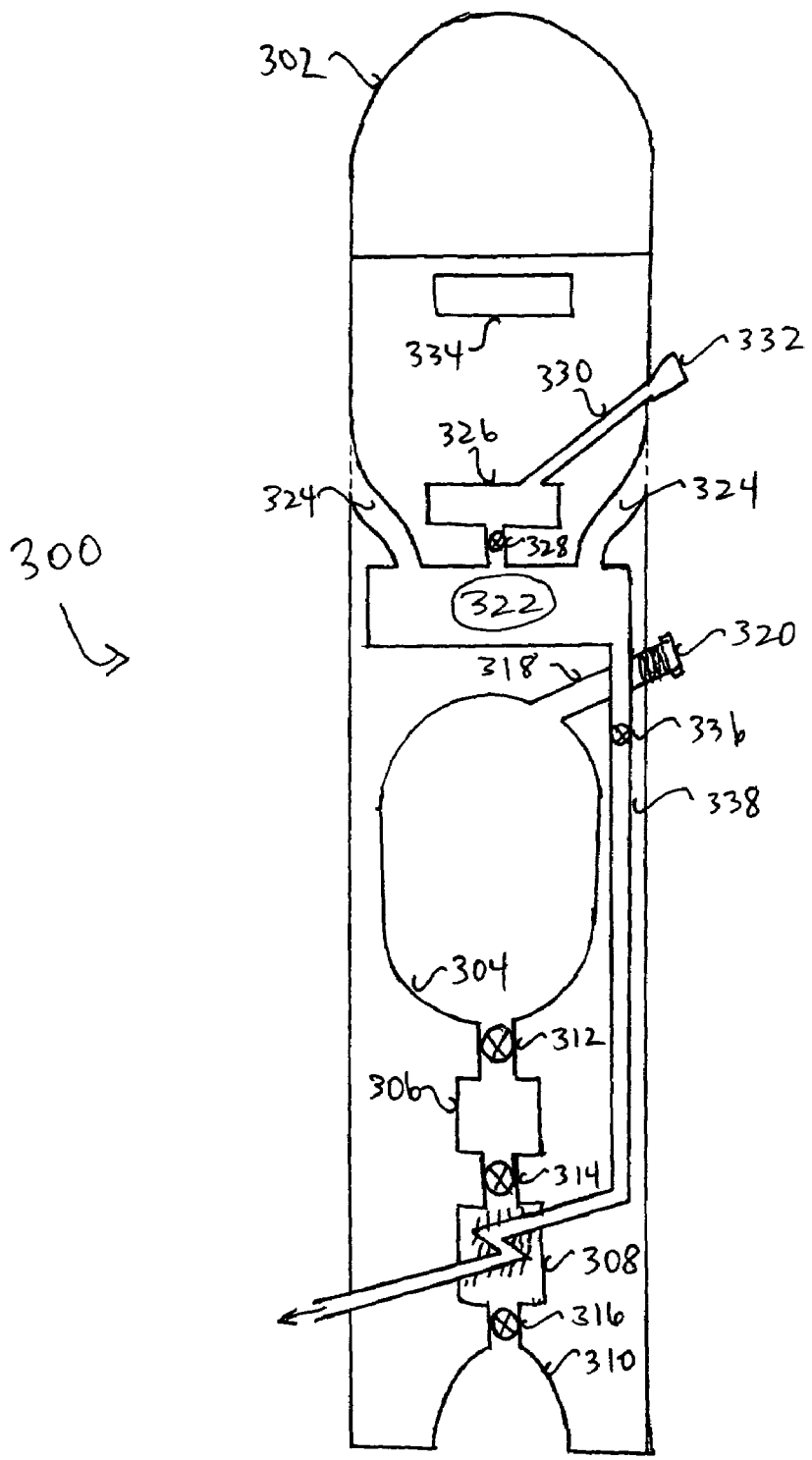
FIG. 4 shows a rocket according to another preferred embodiment.

Referring now to FIG. 4, another variation of the present invention is shown. An air-breathing external combustion pump-fed (as opposed to pressure-fed) rocket 300 comprises passenger accommodations 302, a low-pressure working medium tank 304 connected to a pump 306 via a valve 312.

The low-pressure tank 304 is preferably not configured to withstand a high pressure, such as the output pressure of the pump 306, so that the tank's wall thickness and corresponding mass are reduced as compared to the high-pressure tanks 8, 108 of FIGS. 1 and 2. The system may be safer because there is little threat of a dangerous explosion of low-pressure tank 304. Pump 306 is any type of pump currently known in the art, such as (but by no means limited to) an axially compressing pump, a radially compressing pump, a centrifugally compressing pump, a reciprocating piston pump, a Rotating Spindle Pump™ (as described in U.S. Pat. No. 6,499,288), etc. Pump 306 may be powered by any available power source, such as an onboard electric or battery source or by a chemical fuel, such as the fuel in fuel tank 326. Pump 306 serves to increase the pressure of the working medium (e.g., water) in the working medium tank from a low pressure at inlet to a high pressure at outlet. The high pressure may be any of the pressures previously mentioned, such as at least 10 or 20 or 50 or 100 bar.

The pump 306 feeds water from the low-pressure tank 304 to the heat exchanger 308 via a valve 314. The heat exchanger 308 may comprise two portions, situated directly adjacent to each other, the first portion configured to heat and boil the water to generate a saturated steam/gas, and the second portion configured to superheat the saturated gas to create a high-energy, superheated, nonsaturated gas. Preferably, little or no heating occurs inside the low-pressure tank 8, so as to prevent the vapor pressure of the working medium from exceeding a threshold pressure of the tank 8. The rocket 300 further comprises a nozzle 310 connected to the heat exchanger 308 via another valve 316, through which the superheated, nonsaturated gas flows and expands to generate thrust.

The working medium tank 304 comprises a filling conduit 318 and a pressure-sealing valve/cap 320. The rocket 300 further comprises a combustor 322 connected to the heat exchanger 308 via a conduit 338. A valve 336 is located between the combustor 322 and the heat exchanger 308 to adjust the flow rate of hot product gas to the heat exchanger 308. The rocket 300 further comprises a fuel tank 326 connected to the combustor 322 via a valve 328, and a fuel fill conduit 330 and fuel fill valve 332 connected to the fuel tank 326. The rocket 300 further comprises air scoops/intakes 324 connected to the combustor 322, as well as a rocket parachute 334. The function and features of these elements may be similar to corresponding elements described with respect to other embodiments.

In operation, once low-pressure tank 304 is filled with working medium (preferably water), the tank 304 is either pressurized by adding a small quantity of pressurant (such as nitrogen or air) to a low pressure, high enough only to induce sufficient flow of the water into the inlet of pump 306, or the water in the tank 304 is heated to a vapor pressure sufficient to induce sufficient flow of the water into the inlet of pump 306. Fuel and air are injected into and ignited in the combustor 322, which generates hot product gases that are directed via conduit 338 to heat exchanger 308. At approximately the same time, the pump 306 is started to operate, and valves 312, 314, and 316 are opened, causing water to be pumped from low-pressure tank 304 to the heat exchanger 308 at high pressure due to the pump 306. Heat is added to the water in the heat exchanger 308, where it is boiled and heated to create a superheated, nonsaturated gas that subsequently flows and expands through the nozzle 310 to generate thrust.

Figure 5:
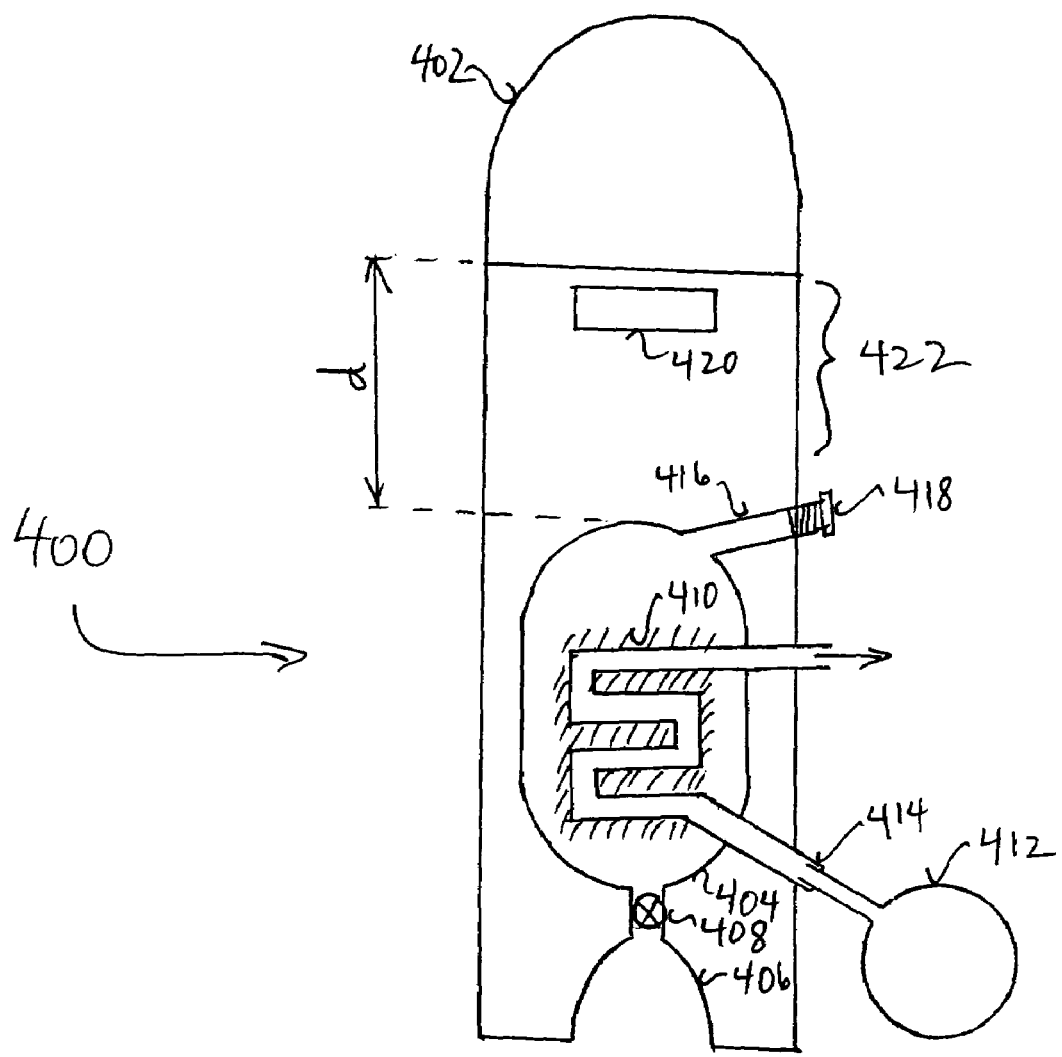
FIG. 5 shows a rocket according to another preferred embodiment.

Referring now to FIG. 5, a rocket 400, a very simple rocket in design, comprises passenger accommodations 402, a high-pressure working medium tank 404, and a nozzle 406 connected to the high-pressure tank 404 via an engine valve 408. The high-pressure tank includes a heat exchanger 410 that is connectable to an external heat source 412 via a preferably quick-disconnect connector 414. The high-pressure tank 404 includes a filling conduit 416 having a filling valve/cap 418. The rocket 400 also includes a rocket parachute 420, and a distance d between the accommodations 402 and the high-pressure tank 404 is sufficient to attenuate the damaging high-pressure steam and/or shrapnel caused by an unexpected explosion and/or breach of the tank 404. The distance d may be any of the distances previously mentioned with respect to FIG. 1. The rocket 400 may also include a shock absorber 422.

In operation, after the high-pressure tank 404 has been filled with the working medium (e.g., water) under low pressure and subsequently sealed with valve/cap 418, the external heat source 412, which is connected to the heat exchanger 410 via quick-disconnect connector 414, generates heat to heat the heat exchanger 410 (and ultimately the water that is in thermal contact with the heat exchanger 410), until the water inside tank 404 has reached the desired vapor pressure. Then the rocket 400 is quickly disconnected from the external heat source 412 either immediately before or during the rocket's launch. The rocket 400 is launched simply by opening engine valve 408, allowing high-pressure water to flow, boil, and expand through the nozzle 406. Of course, while the rocket 400 is much simpler than other embodiments shown, its performance is far lower because the resulting steam is not superheated. External heat source 412 may be any heat source known in the prior art: chemical, electrical, nuclear, solar, wind, geothermal, etc.—or, if the customer pays the right price, thermonuclear. Who wouldn't want to ride in a thermonuclear-propelled rocket? The heat exchanger 410 may comprise a conduit through which hot gas flows, or it may be an electrical resistor or any other heat exchanger known in the art.

Figure 6:
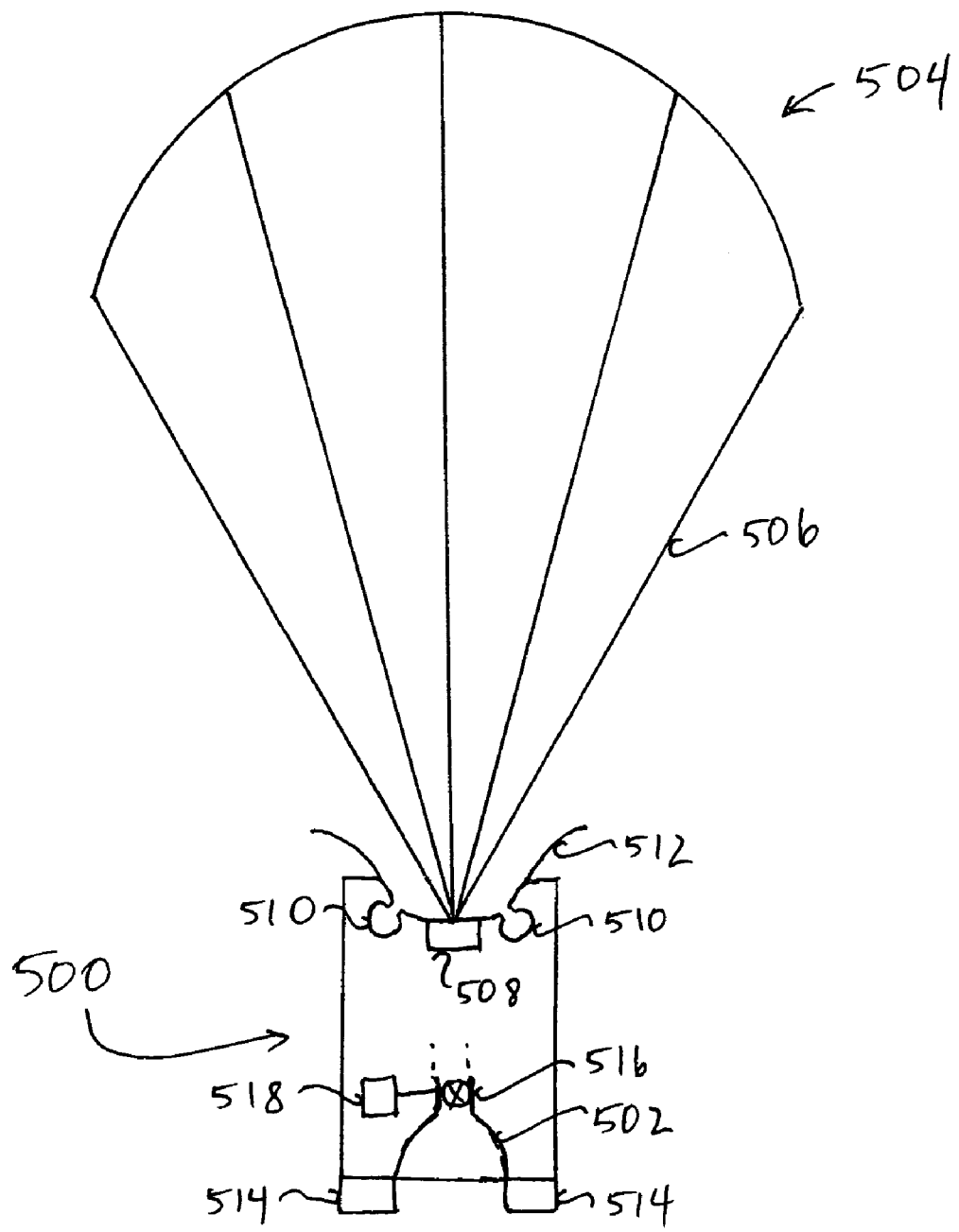
FIG. 6 shows a spent first rocket stage landing via a parachute 504.

Referring now to FIG. 6, one possible recovery system of a rocket and/or rocket stage will be described. The rockets of the present invention are preferably "reusable launch vehicles," as the cost of recovery should be far less than the cost of construction. Of course, the rocket or stage may have wings and may be glided down to a landing. Therefore, any of the rockets and/or stages described herein may have wings and/or tails and/or other control devices sufficient to allow the rocket and/or stage to fly or glide back to a safe landing. In a preferred embodiment, each rocket and/or stage is landed via parachute for simplicity of design.

In FIG. 6, a "spent" rocket and/or stage 500 is shown falling to a landing via a parachute 504. The drawing does not show all of the "guts" of the rocket/stage 500, but does show a nozzle 502 connected to a valve 516, such as a binary or continuous valve, configured to adjust the flow of working medium to and through the nozzle 502. The parachute 504 is connected to a controller 508 via lines 506. The parachute 504 may be of any type currently known in the art, such as a simple "umbrella" style parachute, or one of the more sophisticated "steerable" types. If steerable, parachute 504 may be steered by controlling (such as selectively pulling or releasing on) lines 506, an understood by one of ordinary skill in the art. If steerable, controller 508 may include sensors and/or programs to perform at last one of the following: a) steering the rocket/stage 500 to a predetermined landing region, such as within a 100- or 200-foot radius of a predetermined landing point; and/or b) steering the rocket/stage 500 to a soft landing. Function a) may be performed, e.g., where controller 508 includes a position sensor (such as a global positioning system (GPS) or a land-based radio positioning system, etc.) and a program configured to implement a steering algorithm to land the rocket/stage 500 within the predetermined landing region. Function b) may be performed, e.g., where controller 508 includes an altimeter (such as GPS or, preferably, a sonar, radar, or ladar detector for detecting an actual distance to the landing surface) and a program configured to implement a steering algorithm to land the rocket/stage 500 softly on the landing surface. Those of ordinary skill in the art (particularly the art of skydiving and/or parachuting) understand the method involved to softly land; it involves pulling upward while a couple of feet above the landing surface.

Parachute 504 may be of a "quick-opening" type that does not require the parachute-equipped object (person or rocket) to be falling quickly before the parachute will open. Such a quick-opening parachute 504 includes any currently known in the art. One method of implementing a quick-opening parachute 504 is to include high-pressure gas sources 510 that are configured to release their high-pressure gas toward the parachute 504 to thereby "blow open" the parachute 504 at the desired time of opening. Sources 510 may be any known source, including but not limited to a deflagrating chemical or mixture or a high-pressure pressurized gas source such as a cylinder of liquid carbon dioxide. The source 510 may be sufficient to quickly open the parachute 504 only when the rocket/stage 500 has achieved a certain minimum vertical drop speed (which is presumably less than would ordinarily be necessary without the sources 510), or it may be sufficient to open the parachute 504 even when the rocket/stage 500 has little or no speed (such as at apogee). Reference number 512 may represent a cap or seal that is blow open by the ejection and inflation of parachute 504.

The elements 504–512 may be represented in descriptions of previous embodiments by a single element, such as "rocket parachute 72" in FIG. 1.

If the parachute 504 is not designed to sufficiently slow the rocket/stage 500 to a safe, non-damaging landing, additional features may be necessary. Rocket/stage 500 may alternatively or in addition include deformable materials 514. Deformable materials 514 are preferably plastically deformable, so that upon landing the materials 514 absorb impact energy by deforming. Plastic deformation (as well as materials and structures that plastically deform) are well known in the art, and will not be further described here. However, it should be noted that the structure of materials 514 themselves (such as having a mesh, sponge, honeycomb, etc. structure) may lend further plastic deformability to the deformability of their chemical substance.

Rocket/stage 500 may alternatively or in addition include a sensor/controller 518. Sensor/controller 518 may include an altimeter and may provide a control signal to open the engine vale 516 when the rocket/stage 500 falls to within a predetermined distance from the landing surface. In such an embodiment, the rocket/stage 500 should not have exhausted all of its working medium during its "burn," as this will allow a small remaining quantity of high-pressure working medium to flow and expand through the nozzle 502 in a short, final "burn" upon opening of the valve 516, thus generating thrust to further slow the descent speed of the rocket/stage 500.

Referring now to FIGS. 7a and 7b, human/passenger accommodations 600 include four seats/rests 602a–602d. The seats are configured to allow passengers to comfortably lie on their backs. The seats 602a–602d may also include passenger restraining devices, such as seat belts (not shown). Attached to each seat is a passenger parachute 604a–604d (which may be of the quick-opening type, discussed previously). Each seat and parachute combination is connected to a corresponding ejector 606a–606d. Each ejector 606a–606d contains an ejecting element (not shown), such as a mechanical spring or a pneumatic element containing a high-pressure gas source that is releasable upon receiving an ejection control, and is configured to eject its corresponding seat/parachute pair by providing a large force (upward, as shown in FIGS. 7a and 7b) to the seat/parachute pair. The seat/parachute pair may be detachably connected to their corresponding ejector by any connector known in the art. For example, the connector could be configured to connect the ejector with the seat/parachute pair until a pulling force between them exceeds a predetermined threshold, which may be exceeded when the ejector is activated and the seat/parachute pair is pushed upward at high acceleration (and resulting force). Further detail is omitted for simplicity of explanation. Ejector systems are well known in the art. Further, a method of entertaining using this rocket may include inciting a trained professional to fly in the rocket in one of the seats 602a–602d to assist other passengers in safely executing a flight plan.

The accommodations 600 may also be configured to eject the passengers at different directions, such as by orienting the ejectors 606a–606d in different directions. For example, in FIG. 7a, ejectors 606a and 606d are each oriented at an angle α between the ejector and a back surface of the accommodations 600 less than 90°, so that seat/parachute pair 602a/604a is ejected in a direction different than seat/parachute pairs 602b/604b and 602c/604c, which are ejected in a direction different than seat/parachute pair 602d/604d. In a preferred embodiment, all seat/parachute pairs are ejected in a different direction compared to each other.

Referring to FIG. 7b, the accommodations 600 may include transparent doors 608 that are pivotable about hinges 614 so that the doors 608 may be opened to allow the passengers to be safely ejected during the rocket flight. Also, the ejectors 606a–606d may be mechanically and/or electrically coupled to the doors 608 and configured so that they are mechanically disabled from ejecting until the doors 608 are opened, to prevent an accident of ejecting prior to opening the doors 608. The doors 608 may include a sealing member 610 to prevent high-speed air during the rocket flight from entering the cabin 616 of the accommodations 600. Further, reference number 610 may also or in addition refer to a latch or lock to hold the doors 608 together during flight. The doors 608 may open by any method known, such as by an electric motor. The accommodations 600 are preferably pressure-sealed and may also include a valve and/or pump 612 configured to slowly and steadily during the flight equalize the pressure between the cabin 616 and the outside atmosphere at the point of apogee (which could be several miles in altitude). This feature is to help prevent the passengers from experiencing a dangerous, painful, sudden and significant pressure change when the doors 608 open at the rocket's apogee. The valve/pump 612 could be configured to slowly decrease the pressure in the cabin 616 from launch-level atmospheric pressure to the apogee's atmospheric pressure before the doors 608 are opened. Alternatively, the valve/pump 612 could slowly and safely reduce the cabin's pressure while the rocket remains on the launchpad and while the passengers are inside the cabin 616, so that there is no distracting and bothersome change of pressure during the rocket flight. A source of oxygen (not shown) may be included to increase the cabin's partial pressure of oxygen for the passenger's comfort. Also, the accommodations 600 may include an in-flight television monitor for playing current movies, as well as a helpful, friendly flight attendant who serves the passengers peanuts and beverages. Alcoholic beverages may be $4, correct change only.

Referring now to FIG. 8, a flight plan will be described. At "A," a rocket (such as the rocket 2 shown in FIG. 1) launches with stages s1 and s2 connected, and stage s1 "burning." At "B," the stage s1 has completed its "burn," and the stage s2 "ignites" and begins accelerating away from stage s1. Meanwhile, stage s1 falls toward the ground and eventually its rocket parachute opens and it safely and nondestructively lands (consistent with any of the embodiments previously discussed regarding landing). Of course, stage s1 may have saved some remaining working medium to expand during a final "landing thrust." At "C," stage s2 has completed its "burn," and stage s2 with attached accommodations free fall in a trajectory to the apogee shown at "D." At "D," the doors of the accommodations open and the passenger is ejected. The ejectors (such as ejectors 606a–606d shown in FIG. 7a) are configured to eject the passenger(s) with sufficient speed to ensure a substantial horizontal distance $d_h$ between the passenger(s) and accommodations after the rocket parachute is opened. In "E," the passenger parachute is opened, either automatically or by the passenger. In "F," the parachute controller opens the rocket parachute. Because it is likely that the rocket stage s2 will fall more quickly on the rocket parachute than the passenger on the passenger parachute, the passenger parachute should probably open before the rocket parachute to ensure that the passenger is always above the rocket stage s2 in case a wind current would otherwise cause a collision between the passenger and the rocket stage s2. Of course, both the passenger and the stages s1 and s2 safely land and are recovered, where the process begins again.

It should be understood that each drawing shows a plurality of different possible features of each rocket. Of course, any of the features shown may be "mixed and matched," so that the present invention includes rockets, rocket systems, apparati, and methods that may not be explicitly shown in any one drawing. As an example of such a "mix-and-match," the combination of working medium tank 108, wall 112, first engine valve, and first and second portions 160, 158 shown in FIG. 2 may be substituted for the working medium tank 8, engine valves 46, 48, and first and second portions 10, 26 of FIG. 1.

Further, the present invention also includes advertising methods comprising indicating any of the advantages, features, or benefits of the rockets, rocket systems, apparati, and methods described herein.

The following back-of-the-envelope calculation may help convince the reader that such a cheap, reliable, rocket flight is possible.

Assume a two-stage air-breathing external combustion rocket using water as the working medium. Assume the second stage has about 30% of the entire rocket's water and fuel. Let's see how far we can get on $100 in regular gasoline. (The analysis will consider burning $100 of gasoline during and after launch—i.e., after the water in the working medium tanks has already been heated to the desired vapor pressure. The energy required to bring lukewarm water to such a pressure will come from additional gasoline, but not more than about twice the total gasoline in the rocket for the parameters, temperatures, and pressures used in the following analysis. Thus, the system will use less than $300 in gasoline.)

At the time of filing, $100 pays for at least 50 gallons of gasoline, or 145 kg at a density of 0.75 kg/L or 2.9 kg/gal.

Gasoline releases an energy on combustion of about 45 MJ/kg. The external combustion rocket engine can probably extract about 50% of this energy (for a heat transfer efficiency of about 50%) because high-pressure external combustion boiler systems can achieve relatively high efficiencies. For example, a typical power plant gets 33% to 40% efficiency, but part of the loss in energy comes from transfer of the energy in the high-pressure working medium (usually water) to the energy of a rotating turbine shaft to the energy of a generator to electrical energy. Several of these energy transfer steps are cut out of the present system, in which energy is transferred only from the heat of chemical combustion to heat energy of the high-temperature, high-pressure working medium, which is subsequently expanded through the nozzle to generate thrust. Therefore, a 50% heat transfer efficiency will be assumed (although even a lower value, such as 33%, will increase the total cost of the low-cost system by only 33%). Therefore, 145 kg of gasoline will generate about 3.3 GJ of extractable heat energy.

Assume the system operates at 100 bar (about 10.3 MPa)—i.e., the pressure inside both working medium tanks is about 100 bar. The latent heat of vaporization of water at this pressure is about 1320 kJ/kg. The total mass of water at 100 bar that can be completely vaporized to the same pressure by 3.3 GJ is about 2460 kg (or about 650 gallons at 3.8 kg/gal). The working medium tank of the first stage must therefore have a volume of about 1.9 m³ to accommodate 1720 kg (70% of 2460 kg), which has a volume of 1.72 m³, plus about 10% ullage. The mass $m_{tank,sphere}$ of such a spherical tank can be calculated by the following:

$$m_{tank,sphere} = \frac{P_b V_{tank}}{\phi_{tank} g_0}$$

where $P_b$ is the burst pressure of the tank, $V_{tank}$ is the tank's volume, $\phi_{tank}$ is the tank mass factor (a well-known, empirically derived factor for spherical tanks), and $g_0$ is the gravitational constant (9.8 m/s²). Depending on the tank material and construction, $\phi_{tank}$ typically ranges from 2,500 m (for simple metallic tanks) to 10,000 m (for fiber-reinforced composite tanks). A conservative value of 2,500 m will be assumed for this analysis. Further, $P_b$ is typically twice the maximum expected operating pressure (MEOP), but in this analysis, for added safety to the human passenger (as this rocket is intended for manned flight), $P_b$ will be set at 3×MEOP, or 31 MPa. Thus, the above equation yields 2400 kg. (Notice this is greater than the mass of the water itself, because the pressure is so high.)

Thus, the first stage has a mass of 2400 kg (tank)+1720 kg (water)+100 kg (gasoline)+??? (other stuff such as structure, heat exchangers, parachute, controllers, etc.). Assume the total first stage mass is, therefore, 5000 kg.

Doing a similar analysis of the second stage, which has 3/7 the mass of water, tankage, and fuel. (Thus the total mass of water is about 740 kg, and the total tank mass is about 1030 kg.) The second stage also includes perhaps 200 kg of passengers, for a total mass of about 2340 kg. (The combustor and accommodations are included in the additional "stuff" mass of the system.) Thus, the total rocket mass is 7340 kg (about 16,000 lbs.).

In order to ensure a liftoff acceleration of about 2 g (or 1 g in vertical upward acceleration), thrust must be 7340 kg*2 g=144 kN (about 32,000 lbs.).

Thrust (T) equals mass flow rate (mdot) multiplied by average velocity (v) through the nozzle throat multiplied by a nozzle multiplication factor (n). Thrust (T) also equals the pressure (P) at the throat multiplied by the throat area (A) multiplied by nozzle multiplication factor (n). Also, mass flow rate (mdot) equals density (ρ) of the gas at the throat multiplied by average velocity (v) multiplied by the throat area (A). Therefore:

$$T = PAn =$$

$$\dot{m}vn = (\rho vA)vn = \rho v^2 An \Rightarrow v = \sqrt{\frac{T}{\rho An}} \Rightarrow \dot{m} = \sqrt{\frac{\rho AT}{n}} = \frac{T}{n}\sqrt{\frac{\rho}{P}}$$

The density of saturated steam at 100 bar is about 55 kg/m$^3$. A typical nozzle multiplication factor of 1.5 to 2.0 is easily obtainable. (n=1.5 will be assumed to be conservative.) Therefore, the mass flow rate (mdot) for the first stage is found using the above equation to be about 220 kg/s. (This corresponds to a nozzle throat area (A) of about 0.0093 m$^2$, or 14.5 in$^2$.) The first stage will therefore expand 1720 kg of water in 7.8 seconds—i.e., the first stage "burn" time t1 is 7.8 seconds. (This analysis does not account for a substantially reduced steam density for superheated, nonsaturated steam that is created by a second heat exchanger and/or a heat exchanger that continues heating the steam long after it has boiled. In such a case, the required mass flow rate (mdot) to sustain the 2 g acceleration is substantially lower, thus improving efficiency, increasing the total "burn" time of the first stage, and increasing the total altitude attainable by the present rocket.)

A similar analysis for the second stage will be performed. Again, a beginning acceleration of 2 g will be assumed. However, 2 g was chosen as the initial acceleration of the first stage only to ensure that the rocket quickly gains enough speed and momentum to allow fins to guide and stabilize the rocket. Because the rocket is already moving very quickly (calculated below) at the time of its "ignition" (although there is no real ignition, just an opening of a valve), the starting acceleration could and should be 1 g or a little higher, just enough to overcome gravity and air resistance. This will increase the total "burn time" and allow an increase in the total altitude achievable by the present rocket system. Nevertheless, for simplicity of analysis, an initial 2 g acceleration will be imputed to the second stage.

Because the second stage has a mass of 2340 kg, the required thrust to attain an acceleration of 2 g is about 46 kN (about 10,000 lbs.). From the above equation, the total required mass flow rate is 71 kg/s. (This corresponds to a nozzle throat area (A) of about 0.0030 m$^2$, or 4.6 in$^2$.) The second stage will therefore expand 740 kg of water in 10.4 seconds—i.e., the second stage "burn" time t2 is 10.4 seconds.

During the first "burn," because the water is being ejected with the thrust remaining approximately constant, the acceleration increases from 2.0 g to 144 kN/g (7340 kg total–1720 kg water)=2.61 g. Thus, the average upward acceleration a1 during the first "burn" is (2.0+2.61)/2–1=1.3 g. Assuming a constant acceleration at a1 (for simplicity of calculation), the velocity v1 of the rocket after the first stage "burn" will be 1.3 g*7.8 s=1.3 (9.8 m/s$^2$)*7.8 s=100 m/s (about 225 mi/hr). The altitude x1 of the rocket at this point will be x1=0.5*a1*t1$^2$=0.5*1.3 (9.8 m/s$^2$)*7.8 s$^2$=390 m (about 1300 ft). This analysis neglects air resistance. Air resistance can be reduced by using a streamlined rocket design and by keeping the rocket velocity relatively low (such as by using the second stage to provide a zero upward acceleration, with thrust sufficient only to overcome gravity and air resistance).

During the second "burn," the average upward acceleration a2 can be calculated at 1.45 g. Thus, the velocity v2 after the second "burn" can be calculated as v1+a2*t2=100 m/s+1.45 (9.8 m/s$^2$)*10.4=250 m/s (around 560 mi/hr). The altitude after the second "burn" can be calculated as x2=x1+v1*t2+0.5 a2*t2$^2$=2200 m (1.4 mi).

At the end of the second "burn," the rocket free falls to its apogee, which (again neglecting air resistance) takes a time t(apogee) of 250 m/s divided by g (9.8 m/s$^2$), or t(apogee)=26 seconds. The additional altitude gained during the free fall is about v2*t(apogee)–0.5 (9.8 m/s$^2$) t(apogee)$^2$=3200 m. Thus, the total altitude attainable by this two-stage system is 5400 m (about 3.3 mi, or about 17,700 ft). Typically, sport skydiving is initiated at a slightly lower altitude, such as 13,000 ft. Thus, the present rocket system (modified accordingly) could accommodate human passengers who are ejected from the rocket at the rocket's apogee and who subsequently skydive/parachute to their landings.

While the above analysis neglects air resistance for simplicity of calculation, the calculated altitude attainable using the described system should be near that actually attainable, because: a) air resistance can be reduced by letting the second stage be a "sustainer" stage with no additional upward acceleration; b) other improvements in efficiency (such as by superheating the steam to a nonsaturated state) should more than overcome air resistance losses. In other words, the above first-order approximation should be relatively good.

The price of each flight will now be estimated. Depreciation is hard to determine exactly, but can be roughly estimated. Automobiles, which are exceedingly complicated, depreciate on the order of twice the value of the gasoline they consume. The present rocket should depreciate by less, if only because it is far less complicated than an automobile, in both its engine and its features.

If the rocket requires less than $300 in gasoline, and less than $65 in water (650 gallons at $0.10/gal), and if the rocket (which is clearly reusable) depreciates by $600/flight (double the price of its gasoline), and if the rocket requires $600/flight in maintenance, preparation, and insurance (equal to the depreciation), then the cost per flight is something like $1600. Because the rocket could easily accommodate several people per launch (such as four passengers), charging $1500–$2000 per person per flight will yield a hefty profit.

Will people pay $2000 for such a flight? Here's the final analysis. For $2000, an adventure-loving customer will climb aboard a full-sized man-rated rocket. He will sit in the "cockpit," facing directly up toward the sky. He will be wearing a radio headset and will hear "Mission Control" counting down . . . 3-2-1-blastoff. He will feel the launch, including the vibrations and loud roar of a very powerful (32,000 lb.) rocket engine. He will experience an acceleration force of 2.0 to 2.6 g's in the first 7.8 seconds, at which point the first stage will drop off and the second stage will "ignite." Then he will experience an acceleration force of between 2.0 and 2.9 g's in the next 10.4 seconds. If there are clouds above, he will pass right through them at a very high speed. Then, he will feel the acceleration end, and he will experience a 26-second free fall in which he is weightless. Finally, at the rocket's apogee, he is ejected from the rocket at an altitude of three miles and he free falls to about 5,000 ft (about 1 mile), where his parachute opens and he glides to a soft landing. Anyone who longs to travel to space someday can appreciate the thrill of such a ride. It's not an orbital or suborbital flight . . . but it's the next best thing. And it will cost 50 times less than the expected price of a future suborbital flight (for which the technology is not yet even available).

As a sidenote, to give an idea of the power and performance of this simple external combustion "steam" rocket engine, the market price for an "S" class solid rocket motor, which provides a 14,000 lb. thrust for 10 seconds, is about $36,000. The total impulse of this solid propellant engine is almost half that of the first stage engine of the above designed rocket (32,000 lbs. for 7.8 seconds). Yet, the price of operation of the present first stage engine is a few hundred dollars. Further, while the performance of the present rocket engine is lower, it is far safer and more reliable. Unlike the present rocket engine, the currently available "S" class solid rocket motors may explode to create extremely hot, toxic gases.

What is claimed is:

1. A rocket comprising:
   1) an air-breathing external combustion rocket engine comprising:
      a fuel tank configured to contain a fuel combustible with air;
      a working medium tank configured to contain a working medium;
      a combustor connected to the fuel tank and configured to combust said fuel with air to form a hot product gas;
      a heat exchanger connected to the combustor and configured to heat said working medium with said hot product gas via heat conducting walls of the heat exchanger so as to generate a high-energy working medium having a high pressure; and
      a nozzle connected to at least one of the working medium tank and the heat exchanger and configured to expand said high-energy working medium so as to generate thrust; and
   2) accommodations for a human passenger sufficient to allow said human passenger to fly on said rocket.

2. The rocket as claimed in claim 1, further comprising a second stage connected to said accommodations and detachable from a first stage, said first stage comprising said working medium tank, said heat exchanger, and said nozzle, wherein said second stage comprises: said fuel tank; said combustor; a second working medium tank configured to contain a second working medium; a second heat exchanger connected to the combustor and configured to heat said second working medium via heat conducting walls of the second heat exchanger so as to generate a high-energy second working medium having a second high pressure, and a second nozzle configured to expand said high-energy second working medium so as to generate thrust to accelerate said second stage and said accommodations after detachment from said first stage.

3. The rocket as claimed in claim 2, wherein said heat exchanger comprises a first portion and a second portion, wherein said high-energy working medium comprises a liquid phase and a gas phase, wherein said first portion is configured to heat said liquid phase so as to generate a saturated gas, and wherein said second portion is configured to heat said gas phase so as to generate a superheated, nonsaturated gas, and
   wherein said second heat exchanger comprises a third portion and a fourth portion, wherein said high-energy second working medium comprises a second liquid phase and a second gas phase, wherein said third portion is configured to heat said second liquid phase so as to generate a second saturated gas, and wherein said fourth portion is configured to heat said second gas phase so as to generate a second superheated, nonsaturated gas.

4. The rocket as claimed in claim 1, further comprising a second stage connected to said accommodations and detachable from a first stage, said first stage comprising said fuel tank, said working medium tank, said combustor, said heat exchanger, and said nozzle, wherein said second stage comprises: a second working medium tank configured to contain a second working medium; a second heat exchanger configured to heat said second working medium via heat conducting walls of the second heat exchanger so as to generate a high-energy second working medium having a second high pressure; and a second nozzle configured to expand said high-energy second working medium so as to generate thrust to accelerate said second stage and said accommodations after detachment from said first stage.

5. The rocket as claimed in claim 1, further comprising a binary valve configured to start a flow of said high-energy working medium from said nozzle, wherein said binary valve is configured such that: a) while a pressure inside said working medium tank is less than a threshold operating pressure, the valve remains closed; and b) when said pressure rises above the threshold operating pressure, the valve opens approximately fully.

6. The rocket as claimed in claim 1, further comprising a continuous valve configured to be capable of substantially continuously adjusting a flow rate of said high-energy working medium from said nozzle, wherein said continuous valve is configured to adjust said flow rate so that said thrust causes a substantially constant acceleration on said rocket throughout a flight of at least one of said rocket and a stage of said rocket.

7. The rocket as claimed in claim 1, wherein said heat exchanger comprises a first portion and a second portion, wherein said high-energy working medium comprises a liquid phase and a gas phase, wherein said first portion is configured to heat said liquid phase so as to generate a saturated gas, and wherein said second portion is configured to heat said gas phase so as to generate a superheated, nonsaturated gas.

8. The rocket as claimed in claim 1, further comprising a rocket parachute connected to said rocket and a parachute controller connected to said rocket parachute and configured to open said rocket parachute after said rocket reaches a flight apogee, wherein said rocket parachute is configured to land said rocket without causing substantial damage to the rocket.

9. The rocket as claimed in claim 8, further comprising: a valve configured to regulate a flow of said high-energy working medium from said nozzle; and a valve controller connected to said valve and configured to open said valve so as to generate a landing thrust after said rocket parachute has been deployed and before said rocket has landed, wherein a landing impact speed of the rocket is reduced by said landing thrust.

10. The rocket as claimed in claim 8, further comprising a deformable material configured and positioned on the rocket so as to absorb an energy of impact due to the landing of the rocket.

11. The rocket as claimed in claim 8, wherein said rocket parachute comprises a steering mechanism, wherein said rocket further comprises a steering controller connected to said steering mechanism and configured to perform at least one of the following functions: control said steering mechanism so as to land said rocket at a predetermined landing region; and control said steering mechanism so as to reduce a vertical speed of said rocket when landing.

12. The rocket as claimed in claim 8, wherein said rocket parachute is a quick-open parachute that does not require air pressure from a high vertical speed to open the quick-open parachute.

13. The rocket as claimed in claim 1, further comprising a shock absorber between said rocket engine and said accommodations and configured to absorb a shock created by an unexpected breach in the working medium tank.

14. The rocket as claimed in claim 1, wherein said working medium tank is configured to burst in a predictable manner.

15. The rocket as claimed in claim 1, wherein said working medium tank is configured to contain a pressure at least approximately three times greater than said high pressure of said high-energy working medium.

16. The rocket as claimed in claim 1, wherein said working medium tank is constructed substantially of at least one of paper and plastic.

17. The rocket as claimed in claim 1, wherein said rocket is sized and configured to launch said human passenger to an altitude of at least approximately one mile and at most approximately five miles.

18. The rocket as claimed in claim 1, wherein said accommodations are sufficient to allow between two and four passengers to fly on said rocket.

19. The rocket as claimed in claim 1, wherein said accommodations comprise an ejector configured to eject said human passenger approximately when said accommodations have reached an apogee of a flight on said rocket.

20. The rocket as claimed in claim 1, wherein the working medium tank comprises walls having a first thickness, wherein the working medium tank is configured to burst in a predictable manner in a burst region, wherein the burst region comprises curves having a wall thickness thinner than the first thickness.

* * * * *